(12) United States Patent
Liu et al.

(10) Patent No.: US 10,495,919 B2
(45) Date of Patent: Dec. 3, 2019

(54) PHOTOSENSITIVE RESIN COMPOSITION AND MANUFACTURING METHOD OF THE SAME, BLACK MATRIX, PIXEL LAYER, PROTECTION FILM, COLOR FILTER, AND LIQUID CRYSTAL DISPLAY APPARATUS

(71) Applicant: Chi Mei Corporation, Tainan (TW)

(72) Inventors: Fu-Chien Liu, New Taipei (TW); Hao-Wei Liao, Tainan (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 16/101,525

(22) Filed: Aug. 13, 2018

(65) Prior Publication Data
US 2019/0049780 A1 Feb. 14, 2019

(30) Foreign Application Priority Data
Aug. 14, 2017 (TW) .............................. 106127405 A

(51) Int. Cl.
| | |
|---|---|
| *G02F 1/1335* | (2006.01) |
| *C08L 33/14* | (2006.01) |
| *C08F 2/48* | (2006.01) |
| *C08L 67/02* | (2006.01) |

(52) U.S. Cl.
CPC .......... *G02F 1/133514* (2013.01); *C08F 2/48* (2013.01); *C08L 33/14* (2013.01); *C08L 67/02* (2013.01); *G02F 1/133512* (2013.01); *C08L 2203/16* (2013.01); *C08L 2203/20* (2013.01); *G02F 2202/023* (2013.01)

(58) Field of Classification Search
CPC ......... G02F 1/133514; G02F 1/133516; G02F 1/133512; G02F 2001/133519; G02F 2202/023; C08G 63/547; C08G 63/6856; C08L 33/14; C08L 67/02; C08L 2203/16; C08L 2203/20
USPC ....... 428/1.1, 1.3, 1.31; 359/891; 430/280.1; 252/586; 349/97, 106, 110; 427/162
See application file for complete search history.

(56) References Cited

FOREIGN PATENT DOCUMENTS

| | | |
|---|---|---|
| JP | S61213213 | 9/1986 |
| JP | H01152449 | 6/1989 |
| JP | H0578483 | 3/1993 |
| JP | H09325494 | 12/1997 |
| JP | H10133372 | 5/1998 |
| JP | 2006259716 | 9/2006 |

*Primary Examiner* — Ruiyun Zhang
(74) *Attorney, Agent, or Firm* — JCIPRNET

(57) ABSTRACT

A photosensitive resin composition and a manufacturing method thereof, a black matrix, a pixel layer, a protective film, a color filter, and a liquid crystal display apparatus are provided. The photosensitive resin composition includes an alkali-soluble resin (A), a compound (B) containing an ethylenically-unsaturated group, a photoinitiator (C), and a solvent (D), wherein the alkali-soluble resin (A) contains a first alkali-soluble resin (A-1) having all of a fluorene group, a polymerizable unsaturated group, and a carbamate group. The photosensitive resin composition contains a specific alkali-soluble resin (A-1), so that a pattern formed by the photosensitive resin composition has no development residue and good sputtering resistance.

30 Claims, No Drawings

PHOTOSENSITIVE RESIN COMPOSITION AND MANUFACTURING METHOD OF THE SAME, BLACK MATRIX, PIXEL LAYER, PROTECTION FILM, COLOR FILTER, AND LIQUID CRYSTAL DISPLAY APPARATUS

CROSS-REFERENCE TO RELATED APPLICATION

This application claims the priority benefits of Taiwan application serial no. 106127405, filed on Aug. 14, 2017. The entirety of the above-mentioned patent application is hereby incorporated by reference herein and made a part of specification.

BACKGROUND OF THE INVENTION

Field of the Invention

The invention relates to a photosensitive resin composition and a manufacturing method thereof, a black matrix, a pixel layer, a protective film, a color filter, and a liquid crystal display apparatus, and in particular, to a photosensitive resin composition having good sputtering resistance and for which the resulting pattern has no development residue.

Description of Related Art

With the expanding market demand for imaging equipment such as the color liquid crystal display, the manufacturing techniques of the color filter are also diversifying so as to meet the market demand. The color filter is obtained by forming a pixel layer of different hues of the three colors red (R), green (G), and blue (B) in order on the surface of a substrate such as a glass or a plastic sheet on which a black matrix (BM) is formed.

In general, when a negative-type photosensitive coloring composition is used to form a pixel pattern of a color filter, the negative-type photosensitive coloring composition is generally coated on a substrate and developed after being irradiated by an ultraviolet light via a photomask to obtain a pattern. The pattern formed is heated and calcined such that the pattern is securely adhered on the substrate. A pixel pattern is thus formed. Then, the cycle is repeated with the required colors to obtain a pattern of a colored coating. However, if the cycle is repeated, then a larger level difference is generated at the end of each of the BM black matrix and the RGB pixels. Uneven color display is thus generated due to the level difference. In order to inhibit the level difference, a transparent resin layer (protective film) is generally used for the planarization treatment of the color filter. The protective film needs to have features such as the ability to protect the RGB colored layer, heat resistance when liquid crystals are being filled, and hardness against pressure. To display the above hardness, JP H05-78483 discloses a photosensitive resin composition having high crosslink density. Moreover, JP H10-133372 mentions using a protective film composition containing an epoxy compound that can alleviate issues such as poor pattern linearity, but in such techniques, issues such as development residue in the pattern formed by the photosensitive resin composition and poor sputtering resistance still exist.

Moreover, as the color filter becomes lighter and thinner and has higher color saturation, the concentration of the colorant in the photosensitive colored composition needs to be increased. However, if the concentration of the colorant is increased, then the amount of resin in the photosensitive colored composition is reduced as a result. However, when the resin component on the pixel layer surface beneficial to the adhesion with the protective film is reduced, the issue of poor sputtering resistance readily occurs to the pattern formed by the photosensitive resin composition.

In general, in the photosensitive resin composition for the applications above, a composition formed by combining a polyfunctional photocurable monomer having a polymerizable unsaturated bond and an alkali-soluble resin with a photoinitiator is used. For instance, in JP S61-213213 and JP H01-152449, an application of a material used as a color filter is exemplified, and a copolymer of (meth)acrylic acid or (meth)acrylate having a carboxyl group and maleic anhydride and other polymerizable monomers is used as an alkali-soluble resin. However, the pattern formed by the photosensitive resin composition containing the alkali-soluble resin still has development residue and the issue of poor sputtering resistance.

Moreover, with the rising demand for the light-shielding property of the black matrix, the usage amount of the black pigment is increased as a result. For instance, JP 2006-259716 discloses a photosensitive resin composition for a black matrix including a reactive monomer having two functional groups to improve the reaction between each component in the photosensitive resin composition for a black matrix, thereby forming a fine pattern. Accordingly, when the light-shielding property of the black matrix is increased by increasing the usage amount of the black pigment, the sensitivity of the photosensitive resin composition can still be maintained. However, the pattern formed by the photosensitive resin composition still has development residue and the issue of poor sputtering resistance, and therefore the photosensitive resin composition cannot meet industry demands.

Therefore, how to eliminate development residue in the pattern formed by the photosensitive resin composition and improve sputtering resistance to meet industry requirements is an urgent issue for those skilled in the art.

SUMMARY OF THE INVENTION

Accordingly, the invention provides a photosensitive resin composition for a liquid crystal display apparatus and a manufacturing method thereof, a black matrix, a pixel layer, a protective film, and a color filter that can alleviate the issues of development residue and poor sputtering resistance above.

The invention provides a photosensitive resin composition including an alkali-soluble resin (A), a compound (B) containing an ethylenically-unsaturated group, a photoinitiator (C), and a solvent (D). In particular, the alkali-soluble resin (A) includes a first alkali-soluble resin (A-1), and the first alkali-soluble resin (A-1) has all of a fluorene group, a polymerizable unsaturated group, and a carbamate group.

In an embodiment of the invention, the first alkali-soluble resin (A-1) is represented by formula (1) below:

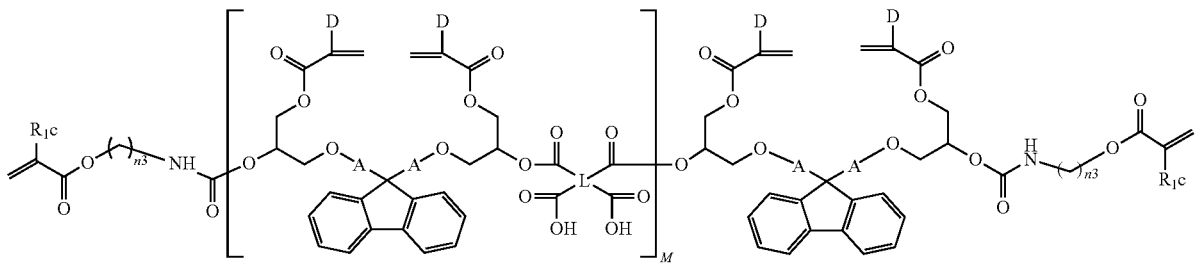

formula (1)

in formula (1), A represents a phenylene group, a hydrogen atom on the phenylene group can be substituted by a C1 to C5 alkyl group, a halogen atom, or a phenyl group; $R_1c$ is a hydrogen atom or a C1 to C8 alkyl group; n3 represents an integer of 1 to 12; L represents a tetravalent carboxylic acid residue; D represents a hydrogen atom or methyl group; and M represents 1 to 20.

In an embodiment of the invention, the unsaturated equivalent range of the first alkali-soluble resin (A-1) is 240 to 1000.

In an embodiment of the invention, the weight-average molecular weight range of the first alkali-soluble resin (A-1) is 1000 to 30000.

In an embodiment of the invention, the acid value range of the first alkali-soluble resin (A-1) is 10 mgKOH/g to 150 mgKOH/g.

In an embodiment of the invention, based on a usage amount of 100 parts by weight of the alkali-soluble resin (A), the usage amount of the first alkali-soluble resin (A-1) is 10 parts by weight to 100 parts by weight, the usage amount of the compound (B) containing an ethylenically-unsaturated group is 20 parts by weight to 150 parts by weight, the usage amount of the photoinitiator (C) is 10 parts by weight to 90 parts by weight, and the usage amount of the solvent (D) is 1000 parts by weight to 7500 parts by weight.

In an embodiment of the invention, the photosensitive resin composition further includes a colorant (E).

In an embodiment of the invention, based on a usage amount of 100 parts by weight of the alkali-soluble resin (A), the usage amount of the colorant (E) is 50 parts by weight to 800 parts by weight.

The invention further provides a black matrix formed by the photosensitive resin composition above.

The invention further provides a pixel layer formed by the photosensitive resin composition above.

The invention further provides a protective film formed by the photosensitive resin composition above.

The invention further provides a color filter including the black matrix above.

The invention further provides a color filter including the pixel layer above.

The invention further provides a color filter including the protective film above.

The invention further provides a liquid crystal display apparatus including the color filter above.

The invention further provides a manufacturing method of a photosensitive resin composition including mixing a composition containing an alkali-soluble resin (A), a compound (B) containing an ethylenically-unsaturated group, a photoinitiator (C), and a solvent (D). In particular, the alkali-soluble resin (A) includes a first alkali-soluble resin (A-1), and the first alkali-soluble resin (A-1) is obtained by reacting a mixture including an (a-1) component, an (a-2) component, and an (a-3) component. The (a-1) component is a diol compound containing a polymerizable unsaturated group, the (a-2) component is a tetracarboxylic acid or an acid dianhydride thereof, and the (a-3) component is a compound containing a polymerizable unsaturated group and an isocyanate group.

In an embodiment of the invention, the (a-1) component is a diol compound containing a polymerizable unsaturated group represented by formula (2) below:

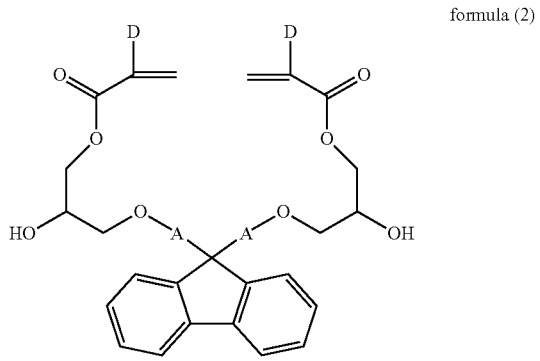

formula (2)

in formula (2), A represents a phenylene group, a hydrogen atom on the phenylene group can be substituted by a C1 to C5 alkyl group, a halogen atom, or a phenyl group; and D represents a hydrogen atom or a methyl group.

In an embodiment of the invention, the (a-3) component is a compound containing a polymerizable unsaturated group and an isocyanate group represented by formula (5) below:

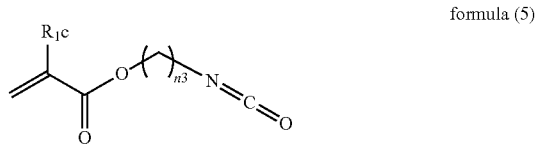

formula (5)

in formula (5), $R_1c$ is hydrogen or a C1 to C8 alkyl group; and n3 is an integer selected from 1 to 12.

In an embodiment of the invention, the molar ratio (a-2)/(a-1) of the (a-1) component and the (a-2) component is 0.2 to 1.0.

In an embodiment of the invention, the molar ratio (a-3)/(a-1) of the (a-1) component and the (a-3) component is 0.02 to 1.6.

The invention further provides a black matrix formed by the photosensitive resin composition formed by the manufacturing method of the photosensitive resin composition above.

The invention further provides a pixel layer formed by the photosensitive resin composition formed by the manufacturing method of the photosensitive resin composition above.

The invention further provides a protective film formed by the photosensitive resin composition formed by the manufacturing method of the photosensitive resin composition above.

The invention further provides a color filter including the black matrix above.

The invention further provides a color filter including the pixel layer above.

The invention further provides a color filter including the protective film above.

The invention further provides a liquid crystal display apparatus including the color filter above.

Based on the above, the photosensitive resin composition of the invention contains the first alkali-soluble resin (A-1) having a specific structure, and therefore when used to form a color filter, the issues of development residue and poor sputtering resistance can be alleviated at the same time, such that the photosensitive resin composition is suitable for the manufacture of a black matrix, pixel layer, and protective film of the color filter.

In order to make the aforementioned features and advantages of the invention more comprehensible, embodiments are described in detail below.

DESCRIPTION OF THE EMBODIMENTS

In the following, (meth)acrylic acid represents acrylic acid and/or methacrylic acid, and (meth)acrylate represents acrylate and/or methacrylate. Similarly, (meth)acryloyl group represents acryloyl group and/or methacryloyl group.

<Photosensitive Resin Composition>

The invention provides a photosensitive resin composition including an alkali-soluble resin (A), a compound (B) containing an ethylenically-unsaturated group, a photoinitiator (C), and a solvent (D). Moreover, the photosensitive resin composition can further include a colorant (E) and an additive (F) if needed. In the following, the individual components used in the photosensitive resin composition of the invention are described in detail.

Alkali-Soluble Resin (A)

The alkali-soluble resin (A) includes a first alkali-soluble resin (A-1). Moreover, the alkali-soluble resin (A) can optionally include a second alkali-soluble resin (A-2) and other alkali-soluble resins (A-3).

First Alkali-Soluble Resin (A-1)

The first alkali-soluble resin (A-1) has all of a fluorene group, a polymerizable unsaturated group, and a carbamate group, and when the photosensitive resin composition does not include the first alkali-soluble resin (A-1), a pattern formed by the photosensitive resin composition has the issue of poor sputtering resistance.

More specifically, the first alkali-soluble resin (A-1) can be represented by formula (1) below:

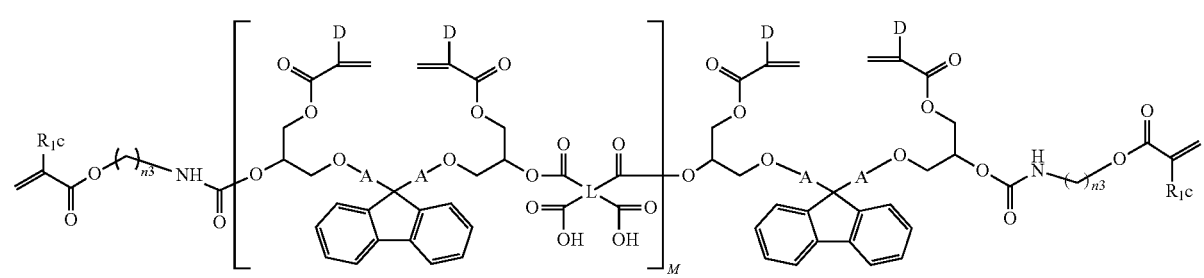

formula (1)

in formula (1), A represents a phenylene group, a hydrogen atom on the phenylene group can be substituted by a C1 to C5 alkyl group, a halogen atom, or a phenyl group; $R_1c$ is a hydrogen atom or a C1 to C8 alkyl group; n3 represents an integer of 1 to 12; L represents a tetravalent carboxylic acid residue; D represents a hydrogen atom or methyl group; and M represents 1 to 20.

The first alkali-soluble resin (A-1) is obtained by reacting a mixture including an (a-1) component, an (a-2) component, and an (a-3) component. The (a-1) component is a diol compound containing a polymerizable unsaturated group, the (a-2) component is a tetracarboxylic acid or an acid dianhydride thereof, and the (a-3) component is a compound containing a polymerizable unsaturated group and an isocyanate group. Moreover, the mixture can further include other compound (a-4) components.

(a-1) Component of Diol Compound Containing a Polymerizable Unsaturated Group

The (a-1) component is preferably a diol compound containing a polymerizable unsaturated group represented by formula (2) below:

formula (2)

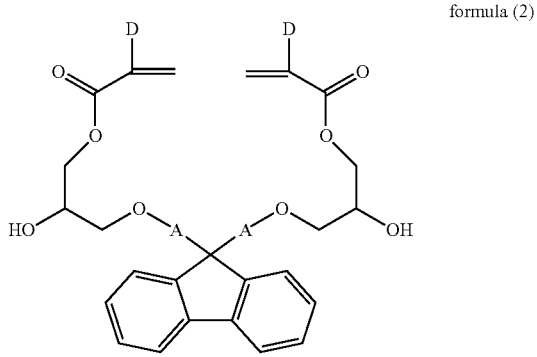

in formula (2), A represents a phenylene group, a hydrogen atom on the phenylene group can be substituted by a C1 to C5 alkyl group, a halogen atom, or a phenyl group; and D represents a hydrogen atom or a methyl group.

The (a-1) component is formed by reacting a mixture, and the mixture contains a bisphenol compound (a-1-i) containing two epoxy groups and a compound (a-1-ii) having at least one carboxylic acid group and at least one ethylenically-unsaturated group. In addition, the mixture can also contain other compounds.

A preferred bisphenol in the bisphenol compound (a-1-i) containing two epoxy groups can include, for instance, 9,9-bis(4-hydroxyphenyl)fluorene, 9,9-bis(4-hydroxy-3-methylphenyl)fluorene, 9,9-bis(4-hydroxy-3-chlorophenyl) fluorene, 9,9-bis(4-hydroxy-3-bromophenyl)fluorene, 9,9-bis(4-hydroxy-3-fluorophenyl)fluorene, or 9,9-bis(4-hydroxy-3,5-dimethylphenyl)fluorene.

The bisphenol compound (a-1-i) containing two epoxy groups can be obtained by, for instance, reacting the bisphenol compound and an epihalohydrin in the presence of an alkali metal hydroxide via dehydrohalogenation reaction.

Specific examples of a suitable epihalohydrin include, for instance: epichlorohydrin, epibromohydrin, or any combination thereof. Before the dehydrohalogenation reaction is performed, an alkali metal hydroxide such as sodium hydroxide or potassium hydroxide can be pre-added or added during the reaction process. The operating temperature of the dehydrohalogenation reaction is 20° C. to 120° C. and the operating time thereof ranges from 1 hour to 10 hours.

In an embodiment, the alkali metal hydroxide added to the dehydrohalogenation reaction can also be an aqueous solution thereof. In the present embodiment, when an aqueous solution of the alkali metal hydroxide is continuously added in the dehydrohalogenation reaction system, water and epihalohydrin can be continuously distilled under reduced pressure or atmospheric pressure at the same time to separate and remove water, and epihalohydrin can be refluxed to the reaction system at the same time.

Before the dehydrohalogenation reaction is performed, a quaternary ammonium salt such as tetramethyl ammonium chloride, tetramethyl ammonium bromide, or trimethyl benzyl ammonium chloride can also be added as a catalyst to react for 1 hour to 5 hours at 50° C. to 150° C. Next, an alkali metal hydroxide or an aqueous solution thereof is added to react for 1 hour to 10 hours at 20° C. to 120° C. to perform the dehydrohalogenation reaction.

Based on a total equivalent of 1 equivalent of the hydroxyl group in the bisphenol compound, the usage amount of the epihalohydrin is 1 equivalent to 20 equivalents, preferably 2 equivalents to 10 equivalents. Based on a total equivalent of 1 equivalent of the hydroxyl group in the bisphenol compound, the usage amount of the alkali metal hydroxide added to the dehydrohalogenation reaction is 0.8 equivalents to 15 equivalents, preferably 0.9 equivalents to 11 equivalents.

Moreover, to facilitate the dehydrohalogenation reaction, in addition to adding an alcohol such as methanol or ethanol, an aprotic polar solvent such as dimethyl sulfone or dimethyl sulfoxide can also be added to perform the reaction. When alcohol is used, based on a total amount of 100 wt % of the epihalohydrin, the usage amount of the alcohol is 2 wt % to 20 wt %, preferably 4 wt % to 15 wt %. When an aprotic polar solvent is used, based on a total amount of 100 wt % of the epihalohydrin, the usage amount of the aprotic polar solvent is 5 wt % to 100 wt %, preferably 10 wt % to 90 wt %.

After the dehydrohalogenation reaction is complete, a rinse treatment can be optionally performed. Then, the epihalohydrin, the alcohol, and the aprotic polar solvent . . . etc. are removed by using a method of heating under reduced pressure, such as at a temperature of 110° C. to 250° C. and a pressure of 1.3 kPa (10 mmHg).

To prevent the epoxy resin formed from containing a hydrolyzable halogen, the solution after the dehydrohalogenation reaction can be added to a solvent such as benzene, toluene, or methyl isobutyl ketone, and then an aqueous solution of an alkali metal hydroxide such as sodium hydroxide or potassium hydroxide can be added to perform the dehydrohalogenation reaction again. In the dehydrohalogenation reaction, based on a total equivalent of 1 equivalent of the hydroxyl group in the bisphenol compound, the usage amount of the alkali metal hydroxide is 0.01 mol to 1 mole, but is preferably 0.05 mol to 0.9 mol. Moreover, the operating temperature of the dehydrohalogenation reaction ranges from 50° C. to 120° C. and the operating time thereof ranges from 0.5 hours to 2 hours.

After the dehydrohalogenation reaction is complete, the salt is removed through steps such as filtering and rinsing. Moreover, solvents such as benzene, toluene, and methyl isobutyl ketone can be distilled by a method of heating under reduced pressure to obtain the bisphenol compound (a-1-i) containing two epoxy groups.

The bisphenol compound (a-1-i) containing two epoxy groups is preferably a bisphenol compound containing two epoxy groups represented by formula (3-1) below or a polymer formed by polymerizing a bisphenol compound monomer containing two epoxy groups represented by formula (3-2) below.

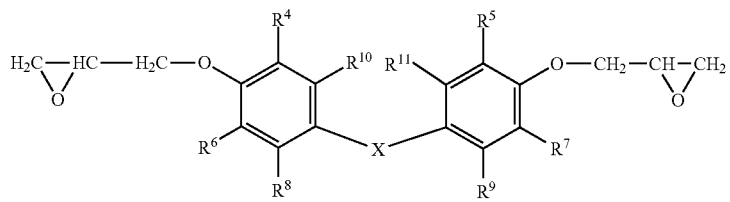

(3-1)

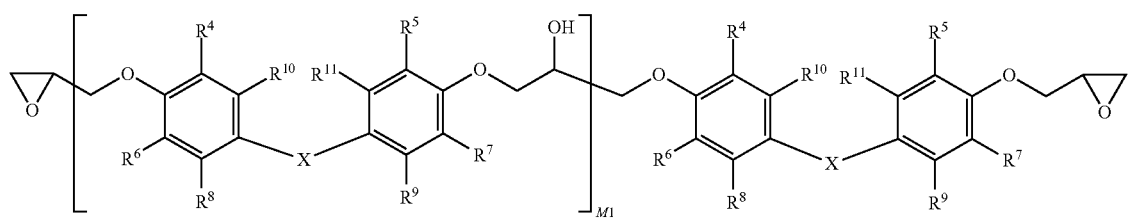

(3-2)

In formula (3-1) and formula (3-2), $R^4$, $R^5$, $R^6$, $R^7$, $R^8$, $R^9$, $R^{10}$, and $R^{11}$ are each independently a hydrogen atom, a halogen atom, a C1 to C5 alkyl group or phenyl group, X represents 9,9-fluorenylidene, and M1 is preferably 1 to 10, more preferably 1 to 2.

The bisphenol compound containing two epoxy groups represented by formula (3-1) is preferably a bisphenol compound containing two epoxy groups represented by formula (4) below.

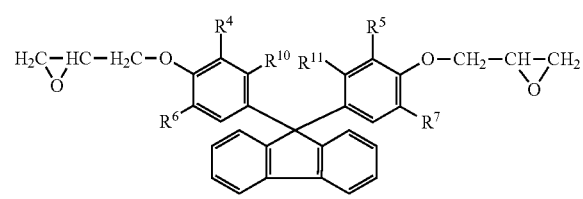

(4)

In formula (4), $R^4$, $R^5$, $R^6$, $R^7$, $R^{10}$, and $R^{11}$ are each independently a hydrogen atom, a halogen atom, a C1 to C5 alkyl group, or a phenyl group.

The bisphenol compound containing two epoxy groups represented by formula (4) is, for instance, a bisphenol fluorene compound containing two epoxy groups obtained by reacting a bisphenol fluorene compound and epihalohydrin.

Examples of the bisphenol fluorene compound can include, for instance, compounds such as 9,9-bis(4-hydroxyphenyl)fluorene, 9,9-bis(4-hydroxy-3-methylphenyl)fluorene, 9,9-bis(4-hydroxy-3-chlorophenyl)fluorene, 9,9-bis(4-hydroxy-3-bromophenyl)fluorene, 9,9-bis(4-hydroxy-3-fluorophenyl)fluorene, 9,9-bis(4-hydroxy-3-methoxyphenyl)fluorene, 9,9-bis(4-hydroxy-3,5-dimethylphenyl)fluorene, 9,9-bis(4-hydroxy-3,5-dichlorophenyl)fluorene, and 9,9-bis(4-hydroxy-3,5-dibromophenyl)fluorene.

Examples of the epihalohydrin can include, for instance: epichlorohydrin and epibromohydrin.

The bisphenol fluorene compound containing two epoxy groups includes commercial products such as: (1) products made by Nippon Steel Chemical such as ESF-300; (2) products made by Osaka Gas such as PG-100 and EG-210; and (3) products made by S.M.S Technology Co such as SMS-F9PhPG, SMS-F9CrG, and SMS-F914PG.

The compound (a-1-ii) having at least one carboxylic acid group and at least one ethylenically-unsaturated group is at least one compound selected from the group consisting of, for instance, the following compounds: acrylic acid, methacrylic acid, 2-methacryloyloxyethylbutanedioic acid, 2-methacryloyloxybutylbutanedioic acid, 2-methacryloyloxyethylhexanedioic acid, 2-methacryloyloxybutylhexanedioic acid, 2-methacryloyloxyethylhexahydrophthalic acid, 2-methacryloyloxyethylmaleic acid, 2-methacryloyloxypropylmaleic acid, 2-methacryloyloxybutylmaleic acid, 2-methacryloyloxypropylbutanedioic acid, 2-methacryloyloxypropylhexanedioic acid, 2-methacryloyloxypropyltetrahydrophthalic acid, 2-methacryloyloxypropylphthalic acid, 2-methacryloyloxybutylphthalic acid, and 2-methacryloyloxybutylhydrophthalic acid; a compound obtained by reacting (meth)acrylate containing a hydroxyl group and a dicarboxylic acid compound, wherein the dicarboxylic acid compound contains, but is not limited to, adipic acid, succinic acid, maleic acid, or phthalic acid; and a hemiester compound obtained by reacting (meth)acrylate containing a hydroxyl group and a carboxylic acid anhydride compound, wherein the (meth)acrylate containing a hydroxyl group contains, but is not limited to, (2-hydroxyethyl) acrylate, (2-hydroxyethyl) methacrylate, (2-hydroxypropyl) acrylate, (2-hydroxypropyl) methacrylate, (4-hydroxybutyl) acrylate, (4-hydroxybutyl) methacrylate, or pentaerythritol trimethacrylate. Moreover, the carboxylic acid anhydride compound can be at least one selected from the group consisting of the following compounds: a dicarboxylic acid anhydride compound such as butanedioic anhydride, maleic anhydride, itaconic anhydride, phthalic anhydride, tetrahydrophthalic anhydride, hexahydrophthalic anhydride, methyl tetrahydrophthalic anhydride, methyl hexahydrophthalic anhydride, methyl endo-methylene tetrahydro phthalic anhydride, chlorendic anhydride, glutaric anhydride, and 1,3-dioxoisobenzofuran-5-carboxylic anhydride; and a tetracarboxylic acid anhydride compound such as benzophenone tetracarboxylic dianhydride (BTDA for short), biphenyltetracarboxylic dianhydride, or diphenyl ether tetracarboxylic acid dianhydride.

(a-2) Component of Tetracarboxylic Acid or Acid Dianhydride Thereof

The (a-2) component is at least one selected from the group consisting of saturated straight-chain hydrocarbon tetracarboxylic acid, alicyclic tetracarboxylic acid, aromatic tetracarboxylic acid, and the acid dianhydrides.

Examples of the saturated straight-chain hydrocarbon tetracarboxylic acid can include: butanetetracarboxylic acid, pentanetetracarboxylic acid, and hexanetetracarboxylic acid. The saturated straight-chain hydrocarbon tetracarboxylic acid can also have a substituent.

Examples of the alicyclic tetracarboxylic acid can include: cyclobutanetetracarboxylic acid, cyclopentanetetracarboxylic acid, cyclohexanetetracarboxylic acid, and norbornane tetracarboxylic acid. The alicyclic tetracarboxylic acid can also have a substituent.

The aromatic tetracarboxylic acid and an acid dianhydride thereof can include pyromellitic acid, benzophenone tetracarboxylic acid, biphenyltetracarboxylic acid, biphenylether tetracarboxylic acid, diphenylsulfonetetracarboxylic acid, 1,2,3,6-tetrahydrophthalic acid, 3,3',4,4'-biphenyl tetracarboxylic dianhydride, 3,3',4,4'-benzophenone tetracarboxylic dianhydride, or 3,3',4,4'-oxydiphenyl tetracarboxylic dianhydride.

In the invention, the (a-2) component is preferably biphenyltetracarboxylic acid, benzophenone tetracarboxylic acid, biphenylether tetracarboxylic acid, or the acid dianhydrides, and more preferably biphenyltetracarboxylic acid, biphenylether tetracarboxylic acid, or the acid dianhydrides.

(a-3) Component of Compound of Polymerizable Unsaturated Group and Isocyanate Group The (a-3) component is a compound containing a polymerizable unsaturated group and an isocyanate group represented by formula (5) below:

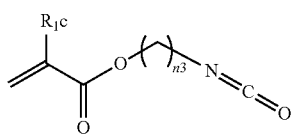

formula (5)

in formula (5), $R_1c$ is a hydrogen atom or a C1 to C8 alkyl group; and n3 represents an integer of 1 to 12.

Specifically, n3 in the isocyanate having the structure of formula (5) is preferably 2, 3, 4, 5, 6, 7, 8, 9, or 10, more preferably 2, 3, 4, 5, 6, or 7, and most preferably 2, 3, or 4. $R_1c$ in the isocyanate having the structure of formula (5) is preferably a hydrogen atom or a C1 to C4 alkyl group, more preferably hydrogen, a methyl group, or an ethyl group, and most preferably hydrogen or a methyl group, in particular hydrogen.

More specifically, the isocyanate having the structure of formula (5) is 2-isocyanatoethyl methacrylate, 2-isocyanatoethyl acrylate, 2-isocyanatopropyl methacrylate, 2-isocyanatopropyl acrylate, 2-isocyanatobutyl methacrylate, 2-isocyanatobutyl acrylate, 2-isocyanatopentyl methacrylate, 2-isocyanatopentyl acrylate, 2-isocyanatohexyl methacrylate, 2-isocyanatohexyl acrylate, 2-isocyanatoheptyl methacrylate, 2-isocyanatoheptyl acrylate, 2-isocyanatooctyl methacrylate, 2-isocyanatooctyl acrylate, 2-isocyanatononyl methacrylate, 2-isocyanatononyl acrylate, 2-isocyanatodecyl methacrylate, or 2-isocyanatodecyl acrylate.

When the (a-3) component is not used in the synthesis of the first alkali-soluble resin (A-1), a pattern formed by the photosensitive resin composition has the issue of poor sputtering resistance.

(a-4) Component of Other Compounds

The (a-4) component includes dicarboxylic acid or an anhydride thereof, but does not contain the (a-3) component.

Examples of the dicarboxylic acid can include: saturated straight-chain hydrocarbon dicarboxylic acid, saturated cyclic hydrocarbon dicarboxylic acid, and unsaturated dicarboxylic acid.

Examples of the saturated straight-chain hydrocarbon dicarboxylic acid can include succinic acid, acetyl succinic acid, adipic acid, azelaic acid, citramalic acid, malonic acid, glutaric acid, citric acid, tataric acid, ketogluconic acid, pimelic acid, sebacic acid, suberic acid, and diglycolic acid. The hydrocarbon group in the saturated straight-chain hydrocarbon dicarboxylic acid can also be substituted.

Examples of the saturated cyclic hydrocarbon dicarboxylic acid can include hexahydrophthalic acid, cyclobutanedicarboxylic acid, cyclopentanedicarboxylic acid, norbornanedicarboxylic acid, and hexahydrotrimellitic acid. The saturated cyclic hydrocarbon dicarboxylic acid can also be an alicyclic dicarboxylic acid in which a saturated hydrocarbon is substituted.

Examples of the unsaturated dicarboxylic acid can include maleic acid, itaconic acid, phthalic acid, tetrahydrophthalic acid, methyl endo-methylene tetrahydro phthalic acid, chlorendic acid, and trimellitic acid.

The dicarboxylic acids are preferably succinic acid, itaconic acid, tetrahydrophthalic acid, hexahydrotrimellitic acid, phthalic acid, or trimellitic acid, more preferably succinic acid, itaconic acid, or tetrahydrophthalic acid.

The (a-4) component is preferably succinic anhydride, itaconic anhydride, tetrahydrophthalic anhydride, hexahydrotrimellitic anhydride, phthalic anhydride, or trimellitic anhydride, more preferably succinic anhydride, itaconic anhydride, or tetrahydrophthalic anhydride.

Here, the molar ratio (a-2)/(a-1) of the (a-1) component and the (a-2) component is 0.2 to 1.0, preferably 0.3 to 1.0, and more preferably 0.4 to 1.0. When (a-2)/(a-1) is 0.2 or more, the pattern formed by the photosensitive resin composition has no development residue, and when (a-2)/(a-1) is 1.0 or less, the pattern formed by the photosensitive resin composition has better sputtering resistance.

Moreover, the molar ratio (a-3)/(a-1) of the (a-1) component and the (a-3) component is 0.02 to 1.6, preferably 0.1 to 1.4, and more preferably 0.2 to 1.2. When (a-3)/(a-1) is within the range above, a pattern formed by the photosensitive resin composition has better sputtering resistance.

Moreover, the molar ratio (a-4)/(a-1) of the (a-1) component and the (a-4) component is 0 to 0.3, preferably 0 to 0.25; and more preferably 0 to 0.2.

The manufacturing method of the first alkali-soluble resin (A-1) is not particularly limited. The alkali soluble resin (A-1) can be obtained as long as the (a-1) component, the (a-2) component, and the (a-3) component are reacted. For instance, the first alkali-soluble resin (A-1) of the present application can be obtained by heating the bisphenol fluorene epoxy(meth)acrylate used as the (a-1) component in a solvent such as propylene glycol monomethyl ether acetate and reacting with the (a-2) component and the (a-3) component. Moreover, the other compounds (a-4) component can be further added in the mixture of the (a-1) component, the (a-2) component, and the (a-3) component for reaction.

Moreover, the reaction conditions of the solvent and the catalyst used for the manufacture of the (a-1) component and the alkali-soluble resin of the invention are not particularly limited, but a solvent without a hydroxyl group and having a boiling point higher than the reaction temperature is preferred. Examples of the solvent preferably include: cellosolve solvents such as ethyl cellosolve acetate and butyl cellosolve acetate; ether or ester solvents having a high boiling point such as diglyme, ethylcarbitol acetate, butylcarbitol acetate, and propylene glycol monomethyl ether acetate; and ketone solvents such as cyclohexanone and diisobutyl ketone. Moreover, examples of the catalyst can include ammonium salts such as tetraethylammonium bromide and triethylbenzylammonium chloride, and known phosphine catalysts such as triphenylphosphine and tris(2, 6-dimethoxyphenyl)phosphine.

Moreover, the method of reacting the (a-1) component, the (a-2) component, the (a-3) component, and/or the (a-4) component is not particularly limited. For instance, a known method of reacting a diol compound and tetracarboxylic dianhydride at a reaction temperature of 90° C. to 140° C. as described in JP H09-325494 can be used. Preferably, the (a-1) component, the (a-2) component, the (a-3) component, and the (a-4) component are quantitatively reacted in a manner that ends of the compound are carboxyl groups and a molar ratio (a-1):(a-2):(a-3):(a-4)=1:0.2 to 1:0.02 to 1.6:0 to 0.3. Moreover, preferably, the components are uniformly dissolved and reacted at a reaction temperature of 90° C. to 130° C. and then reacted and aged at a reaction temperature of 40° C. to 80° C.

For the first alkali-soluble resin (A-1), the polystyrene-equivalent weight-average molecular weight obtained according to Gel Permeation Chromatography (GPC) is 1000 to 30000, preferably 2000 to 20000, and more preferably 3000 to 15000. When the weight-average molecular weight of the first alkali-soluble resin (A-1) is within the above range, a pattern formed by the photosensitive resin composition has better sputtering resistance.

The unsaturated equivalent of the first alkali-soluble resin (A-1) is 240 to 1000, preferably 270 to 900, and more preferably 300 to 800. When the unsaturated equivalent of the alkali-soluble resin (A-1) is within the above range, a pattern formed by the photosensitive resin composition has better sputtering resistance.

The acid value of the first alkali-soluble resin (A-1) is 10 mgKOH/g to 150 mgKOH/g, preferably 30 mgKOH/g to 90 mgKOH/g. When the acid value of the first alkali-soluble resin (A-1) is 10 mgKOH/g or more, a pattern formed by the photosensitive resin composition has no development residue, and when the acid value of the first alkali-soluble resin (A-1) is 150 mgKOH/g or less, a pattern formed by the photosensitive resin composition has better sputtering resistance.

Based on a usage amount of 100 parts by weight of the alkali-soluble resin (A), the usage amount of the first alkali-soluble resin (A-1) can be 10 parts by weight to 100 parts by weight, preferably 20 parts by weight to 100 parts by weight, and more preferably 30 parts by weight to 100 parts by weight.

Second Alkali-Soluble Resin (A-2)

The second alkali-soluble resin (A-2) includes a derived unit having the structure represented by formula (6):

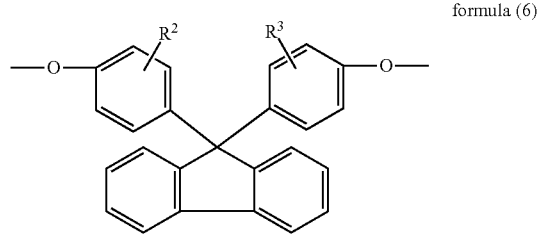

formula (6)

in formula (6), $R^2$ and $R^3$ are each independently a hydrogen atom, a C1 to C5 straight-chain or branch-chain alkyl group, a phenyl group, or a halogen atom.

The second alkali-soluble resin (A-2) is obtained by reacting a compound having the structure represented by formula (6) and other copolymerizable compounds. The compound having the structure represented by formula (6) can be a bisphenol fluorene compound containing two epoxy groups represented by formula (7) below or a bisphenol fluorene compound containing two hydroxyl groups represented by formula (8) below.

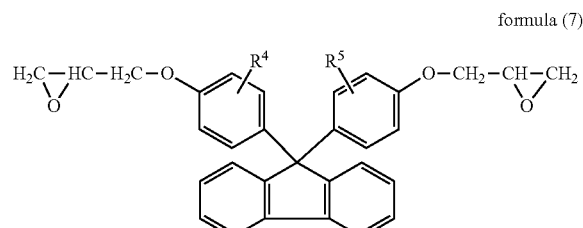

formula (7)

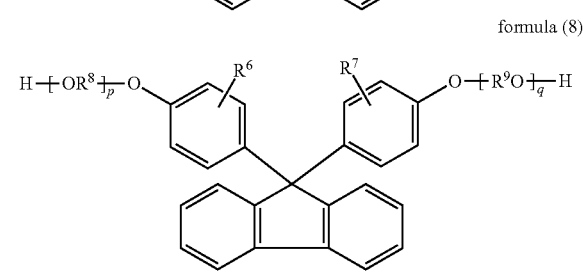

formula (8)

in formula (7), $R^4$ is the same as $R^2$ of formula (6); $R^5$ is the same as $R^3$ of formula (6); in formula (8), $R^6$ is the same as $R^2$ of formula (6); $R^7$ is the same as $R^3$ of formula (6); $R^8$ and $R^9$ each independently represent a C1 to C20 alkylene group or alicyclic group; and p and q each independently represent an integer of 1 to 4.

The bisphenol fluorene compound containing two epoxy groups includes commercial products such as: (1) products made by Nippon Steel Chemical such as ESF-300; and (2) products made by Osaka Gas such as PG-100 and EG-210.

Specific examples of the other copolymerizable compounds include an unsaturated monocarboxylic acid such as acrylic acid, methacrylic acid, butenoic acid, α-chloroacrylic acid, ethyl acrylic acid, or cinnamic acid; a dicarboxylic acid such as maleic acid, itaconic acid, succinic acid, phthalic acid, tetrahydrophthalic acid, hexahydrophthalic acid, methyl tetrahydrophthalic acid, methyl hexahydrophthalic acid, methyl endo-methylene tetrahydro phthalic acid, chlorendic acid, or glutaric acid, and an acid anhydride thereof; a tricarboxylic acid such as trimellitic acid and an acid anhydride thereof; a tetracarboxylic acid and acid dianhydride thereof such as pyromellitic acid, benzophenone tetracarboxylic acid, 3,3',4,4'-benzophenone tetracarboxylic acid, 3,3',4,4'-oxydiphenyltetracarboxylic acid, 3,3',4,4'-biphenyl tetracarboxylic acid, or biphenylether tetracarboxylic acid; and 2-methacryloyloxyethyl succinate, and a combination of the above compounds.

The second alkali-soluble resin (A-2) is preferably a product made by Nippon Steel Chemical such as V259ME or V301ME.

Based on a usage amount of 100 parts by weight of the alkali-soluble resin (A), the usage amount of the second alkali-soluble resin (A-2) can be 0 parts by weight to 90 parts by weight, preferably 0 parts by weight to 80 parts by weight, and more preferably 0 parts by weight to 70 parts by weight.

Other Alkali-Soluble Resins (A-3)

The alkali-soluble resin (A) can further optionally include other alkali-soluble resins (A-3). The other alkali-soluble resins (A-3) are resins other than the first alkali-soluble resin (A-1) and the second alkali-soluble resin (A-2). The other alkali-soluble resins (A-3) are, for instance, resins having a carboxylic acid group or a hydroxyl group, but are not limited to resins having a carboxylic acid group or a hydroxyl group. Specific examples of the other alkali-soluble resins (A-3) include a resin such as acrylic resin, urethane resin, or novolac resin.

Based on a usage amount of 100 parts by weight of the alkali-soluble resin (A), the usage amount of the other alkali-soluble resins (A-3) is 0 parts by weight to 30 parts by weight, preferably 0 parts by weight to 20 parts by weight, and more preferably 0 parts by weight to 10 parts by weight.

Compound (B) Containing Ethylenically-Unsaturated Group

The compound (B) containing an ethylenically-unsaturated group can be selected from a compound having 1 ethylenically-unsaturated group and a compound having at least 2 (including 2) ethylenically-unsaturated groups.

Specific examples of the compound having 1 ethylenically-unsaturated group include (meth)acrylamide, (meth)acryloylmorpholine, 7-amino-3,7-dimethyloctyl (meth)acrylate, isobutoxymethyl (meth)acrylamide, isobornyloxyethyl (meth)acrylate, isobornyl (meth)acrylate, 2-ethylhexyl (meth)acrylate, ethyl diethylene glycol (meth)acrylate, tert-octyl (meth)acrylamide, diacetone (meth)acrylamide, dimethylaminoethyl (meth)acrylate, dodecyl (meth)acrylate, dicyclopentenyloxyethyl (meth)acrylate, dicyclopentenyl (meth)acrylate, N,N-dimethyl (meth)acrylamide, tetrachlorophenyl (meth)acrylate, 2-tetrachlorophenoxy ethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, ethyl 2-hydroxy (meth)acrylate, propyl 2-hydroxy (meth)acrylate, vinylcaprolactam, N-vinylpyrrolidone, phenoxyethyl (meth)acrylate, pentachlorophenyl (meth)acrylate, pentabromophenyl (meth)acrylate, polyethylene glycol mono(meth)acrylate, polypropylene glycol mono(meth)acrylate, and bornyl (meth)acrylate. The compound having 1 ethylenically-unsaturated group can be used alone or in a combination of two or more.

Specific examples of the compound having at least 2 (including 2) ethylenically-unsaturated groups include ethylene glycol di(meth)acrylate, dicyclopentenyl di(meth)acrylate, triethylene glycol di(meth)acrylate, tetraethylene glycol di(meth)acrylate, tri(2-hydroxyethyl)isocyanate di(meth)acrylate, tri(2-hydroxyethyl)isocyanate tri(meth)acrylate, caprolactone-modified tri(2-hydroxyethyl)isocyanate tri(meth)acrylate, trimethylolpropyl tri(meth)acrylate, ethylene oxide (EO)-modified trimethylolpropyl tri(meth)acrylate, propylene oxide (PO)-modified trimethylolpropyl tri(meth)acrylate, tripropylene glycol di(meth)acrylate, neopentyl glycol di(meth)acrylate, 1,4-butanediol di(meth)acrylate, 1,6-hexanediol di(meth)acrylate, pentaerythritol tri(meth)acrylate, pentaerythritol tetra(meth)acrylate, polyester di(meth)acrylate, polyethylene glycol di(meth)acrylate, dipentaerythritol hexa(meth)acrylate, dipentaerythritol penta(meth)acrylate, dipentaerythritol tetra(meth)acrylate, caprolactone-modified dipentaerythritol hexa(meth)acrylate, caprolactone-modified dipentaerythritol penta(meth)acrylate, di(trimethylolpropane) tetra(meth)acrylate, EO-modified bisphenol A di(meth)acrylate, PO-modified bisphenol A di(meth)acrylate, EO-modified hydrogenated bisphenol A di(meth)acrylate, PO-modified hydrogenated bisphenol A di(meth)acrylate, PO-modified glycerol triacrylate, EO-modified bisphenol F di(meth)acrylate, novolac polyglycidyl ether (meth)acrylate, a similar compound thereof, and a combination of the compounds. The compound having at least 2 (including 2) ethylenically-unsaturated groups can be used alone or in a combination of two or more.

Specific examples of the compound (B) containing an ethylenically-unsaturated group include trimethylolpropyl triacrylate, EO-modified trimethylolpropyl triacrylate, PO-modified trimethylolpropyl triacrylate, pentaerythritol triacrylate, pentaerythritol tetraacrylate, dipentaerythritol hexaacrylate, dipentaerythritol pentaacrylate, dipentaerythritol tetraacrylate, caprolactone-modified dipentaerythritol hexaacrylate, ditrimethylolpropyl tetraacrylate, PO-modified glycerol triacrylate, a similar compound thereof, and a combination of the compounds.

The compound (B) containing an ethylenically-unsaturated group is preferably trimethylolpropane triacrylate, dipentaerythritol tetracrylate, dipentaerythritol hexaacrylate, or a combination of the compounds.

Based on a usage amount of 100 parts by weight of the alkali-soluble resin (A), the usage amount of the compound (B) containing an ethylenically-unsaturated group can be 20 parts by weight to 150 parts by weight, preferably 25 parts by weight to 130 parts by weight, and more preferably 30 parts by weight to 110 parts by weight.

Photoinitiator (C)

The photoinitiator (C) is, for instance, an acetophenone compound, a biimidazole compound, an acyl oxime compound, or a combination of the compounds.

Specific examples of the acetophenone compound include p-dimethylamino-acetophenone, α,α'-dimethoxyazoxy-acetophenone, 2,2'-dimethyl-2-phenyl-acetophenone, p-methoxy-acetophenone, 2-methyl-1-(4-methylthio phenyl)-2-morpholino-1-propanone, 2-benzyl-2-N,N-dimethylamino-1-(4-morpholinophenyl)-1-butanone, and a combination of the compounds.

Specific examples of the biimidazole compound include 2,2'-bis(o-chlorophenyl)-4,4',5,5'-tetraphenyl-biimidazole, 2,2'-bis(o-fluorophenyl)-4,4',5,5'-tetraphenyl-biimidazole, 2,2'-bis(o-methyl phenyl)-4,4',5,5'-tetraphenyl-biimidazole, 2,2'-bis(o-methoxyphenyl)-4,4',5,5'-tetraphenyl-biimidazole, 2,2'-bis(o-ethylphenyl)-4,4',5,5'-tetraphenyl-biimidazole, 2,2'-bis(p-methoxyphenyl)-4,4',5,5'-tetraphenyl-biimidazole, 2,2'-bis(2,2',4,4'-tetramethoxyphenyl)-4,4',5,5'-tetraphenyl-biimidazole, 2,2'-bis(2-chlorophenyl)-4,4',5,5'-tetraphenyl-biimidazole, 2,2'-bis(2,4-dichlorophenyl)-4,4',5,5'-tetraphenyl-biimidazole, and a combination of the compounds.

Specific examples of the acyl oxime compound include ethanone,1-[9-ethyl-6-(2-methylbenzoyl)-9H-carbazole-3-yl]-,1-(O-acetyl oxime) such as OXE-02 made by Ciba Specialty Chemicals having a structure represented by formula (9), 1-(4-phenyl-thio-phenyl)-octane-1,2-dion 2-oxime-O-benzoate such as OXE-01 made by Ciba Specialty Chemicals having a structure represented by formula (10), ethanone,1-[9-ethyl-6-(2-cholro-4-benzyl-thio-benzoyl)-9H-carbazole-3-yl]-,1-(O-acetyl oxime) made by Asahi Denka Co., Ltd. having a structure represented by formula (11), and a combination of the compounds.

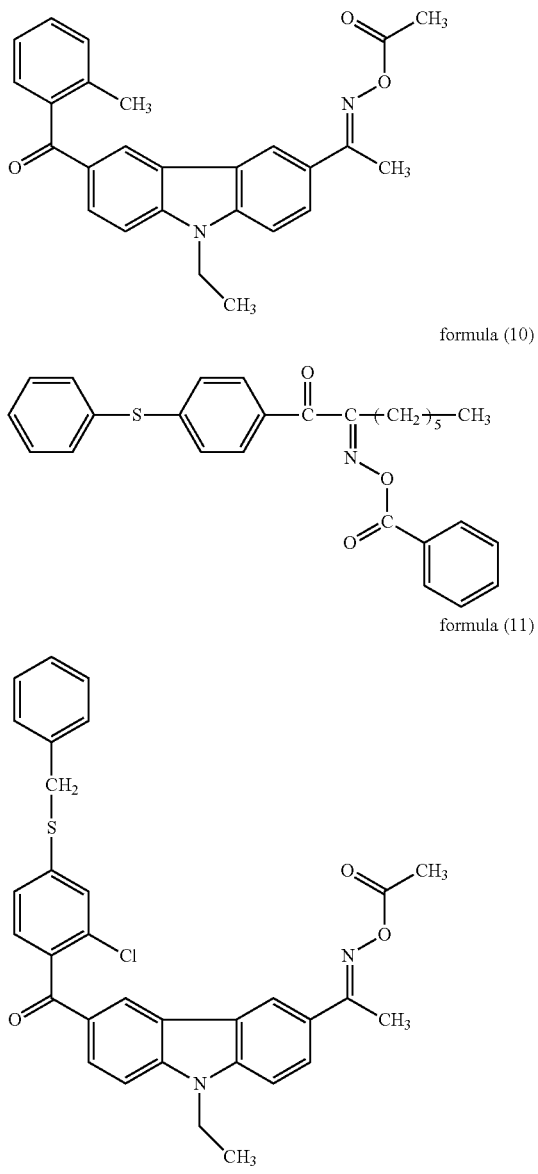

formula (9)

formula (10)

formula (11)

The photoinitiator (C) is preferably 2-methyl-1-(4-methylthio phenyl)-2-morpholino-1-propanone, 2-benzyl-2-N,N-dimethylamino-1-(4-morpholinophenyl)-1-butanone, 2,2'-bis(o-chlorophenyl)-4,4',5,5'-tetraphenyl-biimidazole, ethanone,1-[9-ethyl-6-(2-methylbenzoyl)-9H-carbazole-3-yl]-,1-(O-acetyl oxime), or a combination of the compounds.

The photoinitiator (C) can further include the following compounds as needed: a benzophenone compound such as thioxanthone, 2,4-diethyl-thioxanthanone, thioxanthone-4-sulfone, benzophenone, 4,4'-bis(dimethylamino)benzophenone, or 4,4'-bis(diethylamino)benzophenone; an α-diketone such as benzil or acetyl; an acyloin such as benzoin; an acyloin ether such as benzoin methylether, benzoin ethylether, or benzoin isopropyl ether; an acylphosphineoxide such as 2,4,6-trimethyl-benzoyl-diphenyl-phosphineoxide or bis-(2,6-dimethoxy-benzoyl)-2,4,4-trimethyl-benzyl-phosphineoxide; a quinone such as anthraquinone or 1,4-naphthoquinone; a halide such as phenacyl chloride, tribromomethylphenylsulfone, or tris(trichloromethyl)-s-triazine; a peroxide such as di-tertbutylperoxide, or a combination of the compounds. The compound added to the photoinitiator (C) is preferably a benzophenone compound, more preferably 4,4'-bis(diethylamino)benzophenone.

Based on a usage amount of 100 parts by weight of the alkali-soluble resin (A), the usage amount of the photoinitiator (C) can be 10 parts by weight to 90 parts by weight, preferably 12 parts by weight to 80 parts by weight, and more preferably 15 parts by weight to 70 parts by weight.

Solvent (D)

The solvent (D) refers to a solvent capable of dissolving the alkali-soluble resin (A), the compound (B) containing an ethylenically-unsaturated group, and the photoinitiator (C), but does not react with the components, and preferably has a suitable volatility.

The solvent (D) is, for instance, (poly)alkylene glycol monoalkyl ether, (poly)alkylene glycol monoalkyl ether acetate, other ethers, ketone, alkyl lactate, other esters, an aromatic hydrocarbon compound, carboxylic acid amide, or a combination of the solvents.

Specific examples of the (poly)alkylene glycol monoalkyl ether include ethylene glycol monomethyl ether, ethylene glycol monoethyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether, tripropylene glycol monoethyl ether, and a combination of the solvents.

Specific examples of the (poly)alkylene glycol monoalkyl ether acetate include ethylene glycol monomethyl ether acetate, ethylene glycol monoethyl ether acetate, propylene glycol monomethyl ether acetate, propylene glycol monoethyl ether acetate, and a combination of the solvents.

Specific examples of the other ethers include diethylene glycol dimethyl ether, diethylene glycol methyl ethyl ether, diethylene glycol diethyl ether, tetrahydrofuran, and a combination of the solvents.

Specific examples of the ketone include methyl ethyl ketone, cyclohexanone, 2-heptanone, 3-heptanone, and a combination of the solvents.

Specific examples of the alkyl lactate include methyl 2-hydroxypropionate, ethyl 2-hydroxypropionate, and a combination of the solvents.

Specific examples of the other esters include methyl 2-hydroxy-2-methylpropionate, ethyl 2-hydroxy-2-methylpropionate, methyl 3-methoxypropionate, ethyl 3-methoxypropionate, methyl 3-ethoxypropionate, ethyl 3-ethoxypropionate (EEP), ethyl ethoxyacetate, ethyl hydroxyacetate, methyl 2-hydroxy-3-methylbutyrate, 3-methyl-3-methoxybutyl acetate, 3-methyl-3-methoxybutylpropionate, ethyl acetate, n-propyl acetate, isopropylacetate, n-butyl acetate, isobutyl acetate, n-pentyl acetate, isopentyl acetate, n-butyl propionate, ethyl butyrate, n-propyl butyrate, isopropyl butyrate, n-butyl butyrate, methyl pyruvate, ethyl pyruvate, n-propyl pyruvate, methyl acetoacetate, ethyl acetoacetate, ethyl 2-oxybutyrate, and a combination of the solvents.

Specific examples of the aromatic hydrocarbon compound include toluene, xylene, and a combination of the solvents.

Specific examples of the carboxylic acid amide include N-methylpyrrolidone, N,N-dimethyl formamide, N,N-dimethyl acetamide, and a combination of the solvents.

The solvent (D) is preferably propylene glycol monomethyl ether acetate, EEP, or a combination of the solvents. The solvent (D) can be used alone or in a combination of two or more.

Based on a usage amount of 100 parts by weight of the alkali-soluble resin (A), the usage amount of the solvent (D) can be 1000 parts by weight to 7500 parts by weight, preferably 1200 parts by weight to 7000 parts by weight, and more preferably 1400 parts by weight to 6500 parts by weight.

Colorant (E)

The photosensitive resin composition of the invention can further contain a colorant (E) as needed. When the photosensitive resin composition is used for forming a pixel layer, the colorant (E) can be a first colorant (E-1) used for forming the pixel layer. When the photosensitive resin composition is used for forming a black matrix, the colorant (E) can be a black pigment (E-2) used for forming the black matrix.

First Colorant (E-1)

The first colorant (E-1) includes an inorganic pigment, an organic pigment, or a combination of the two.

Specific examples of the inorganic pigment include a metal compound (a metal oxide of, for instance, iron, cobalt, aluminum, cadmium, lead, copper, titanium, magnesium, chromium, zinc, or antimony) such as a metal oxide or a metallic complex salt and a composite oxide of the metals.

Specific examples of the organic pigment include C. I. pigment yellow 1, 3, 11, 12, 13, 14, 15, 16, 17, 20, 24, 31, 53, 55, 60, 61, 65, 71, 73, 74, 81, 83, 93, 95, 97, 98, 99, 100, 101, 104, 106, 108, 109, 110, 113, 114, 116, 117, 119, 120, 126, 127, 128, 129, 138, 139, 150, 151, 152, 153, 154, 155, 156, 166, 167, 168, 175; C. I. pigment orange 1, 5, 13, 14, 16, 17, 24, 34, 36, 38, 40, 43, 46, 49, 51, 61, 63, 64, 71, 73; C. I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:1, 48:2, 48:3, 48:4, 49:1, 49:2, 50:1, 52:1, 53:1, 57, 57:1, 57:2, 58:2, 58:4, 60:1, 63:1, 63:2, 64:1, 81:1, 83, 88, 90:1, 97, 101, 102, 104, 105, 106, 108, 112, 113, 114, 122, 123, 144, 146, 149, 150, 151, 155, 166, 168, 170, 171, 172, 174, 175, 176, 177, 178, 179, 180, 185, 187, 188, 190, 193, 194, 202, 206, 207, 208, 209, 215, 216, 220, 224, 226, 242, 243, 245, 254, 255, 264, 265; C. I. pigment violet 1, 19, 23, 29, 32, 36, 38, 39; C. I. pigment blue 1, 2, 15, 15:3, 15:4, 15:6, 16, 22, 60, 66; C. I. pigment green 7, 36, 37; C. I. pigment brown 23, 25, 28, and a combination of the pigments.

Black Pigment (E-2)

The black pigment (E-2) is preferably a black pigment having heat resistance, light resistance, and solvent resistance.

Specific examples of the black pigment (E-2) include: a black organic pigment such as perylene black, cyanine black, or aniline black; a near-black mixture of organic pigments obtained by mixing two or more pigments selected from the pigments of, for instance, red, blue, green, purple, yellow, cyanine, or magenta; and a light-shielding material such as carbon black, chromium oxide, ferric oxide, titanium black, or graphite, wherein specific examples of the carbon black include C.I. pigment black 1 and 7 and a commercial product made by Mitsubishi Chemical (product name MA100, MA230, MA8, #970, #1000, #2350, or #2650). The black pigment (E-2) can be used alone or in a combination of two or more.

The black pigment (E-2) is preferably carbon black, and the carbon black is, for instance, the commercial product MA100 or MA230 made by Mitsubishi Chemical.

Based on a usage amount of 100 parts by weight of the alkali-soluble resin (A), the usage amount of the colorant (E) can be 50 parts by weight to 800 parts by weight, preferably 80 parts by weight to 700 parts by weight, and more preferably 100 parts by weight to 600 parts by weight.

Additive (F)

Under the premise of not affecting the efficacy of the invention, the photosensitive resin composition of the invention can optionally further include an additive (F). Specific examples of the additive (F) include a surfactant, a filler, a polymer (other than the alkali-soluble resin (A)), an adhesion promoter, an antioxidant, an ultraviolet absorber, and an anti-coagulant.

The surfactant helps to improve the coating properties of the photosensitive resin composition. Specific examples of the surfactant include a cationic surfactant, an anionic surfactant, a nonionic surfactant, an amphoteric surfactant, a polysiloxane surfactant, a fluorine surfactant, and a combination of the surfactants.

Specifically, the surfactant is, for instance, a polyoxyethylene alkyl ether such as polyoxyethylene lauryl ether, polyoxyethylene stearyl amine ether, or polyoxyethylene oleyl ether; a polyoxyethylene alkyl phenyl ether such as polyoxyethylene octyl phenyl ether or polyoxyethylene nonyl phenyl ether; a polyethylene glycol diester such as polyethylene glycol dilaurate or polyethylene glycol stearyl ether; a sorbitan fatty acid ester; a fatty acid-modified polyester; or tertiary amine-modified polyurethane. The surfactant can be used alone or in multiple combinations.

Specific examples of the surfactant include a KP product made by Shin-Etsu Chemical Co., Ltd., an SF-8427 product made by Dow Corning Toray Co., Ltd., a Polyflow product made by Kyoeisha Chemical Co. Ltd., an F-Top product made by Tochem Products Co., Ltd., a Megafac product made by DIC Corporation, a Fluorade product made by Sumitomo 3M Limited, an Asahi Guard product made by Asahi Glass Co., Ltd., and a Surflon product made by Asahi Glass Co., Ltd.

Specific examples of the filler include, for instance, glass and aluminum.

Specific examples of the polymer include polyvinyl alcohol, polyethylene glycol monoalkyl ether, polyfluoro alkyl acrylate, and a combination of the polymers.

Specific examples of the adhesion promoter include vinyltrimethoxysilane, vinyl triethoxysilane, vinyl-tris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidolpropyltrimethoxysilane, 3-glycidolpropylmethyldiethoxysilane, 3-glycidolpropylmethyldimethoxysilane, 2-(3,4-epoxycyclohexyl)ethyltrimethoxysilane, 3-chloropropylmethyldimethoxysilane, 3-chloropropyltrimethoxysane, 3-methyl propionyloxy propyltrimethoxysilane, 3-mereaptopropyltrimethoxysilane, 3-glycidoxypropyltrimethoxysilane, and a combination of the compounds.

Specific examples of the antioxidant include 2,2-thiobis (4-methyl-6-tert-butylphenol), 2,6-di-tert-butylphenol, and a combination of the compounds.

Specific examples of the ultraviolet absorber include 2-(3-tert-butyl-5-methyl-2-hydroxyphenyl)-5-chlorophenylazide, alkoxy phenone, and a combination of the compounds.

Specific examples of the anti-coagulant include, for instance, sodium polyacrylate.

Based on a usage amount of 100 parts by weight of the alkali-soluble resin (A), the usage amount of the additive (F) is 0.1 part by weight to 10 parts by weight, preferably 0.5 parts by weight to 8 parts by weight, and more preferably 1 part by weight to 6 parts by weight.

<Preparation Method of Photosensitive Resin Composition>

A method that can be used to prepare the photosensitive resin composition includes, for instance: placing and stirring the alkali-soluble resin (A), the compound (B) containing an ethylenically-unsaturated group, the photoinitiator (C), and the solvent (D) in a stirrer such that the components are uniformly mixed into a solution state. When needed, one or both of the colorant (E) and the additive (F) can also be added. After the components are uniformly mixed, the photosensitive resin composition in a solution state can be obtained. Specifically, when the photosensitive resin composition is used for forming a pixel layer, the colorant (E) can be a first colorant (E-1) used for forming the pixel layer. When the photosensitive resin composition is used for forming a black matrix, the colorant (E) can be a black pigment (E-2) used for forming the black matrix.

In addition, the preparation method of the photosensitive resin composition is not particularly limited. The method for preparing the photosensitive resin composition includes, for instance, first dispersing a portion of the alkali-soluble resin (A) and the compound (B) containing an ethylenically-unsaturated group in a portion of the solvent (D) to form a dispersion solution, and then mixing the rest of the colorant (E), the alkali-soluble resin (A), the compound (B) containing an ethylenically-unsaturated group, the photoinitiator (C), and the solvent (D).

Alternatively, the photosensitive resin composition can also be prepared by first dispersing a portion of the colorant (E) in a mixture composed of a portion of the alkali-soluble resin (A) and a portion of the solvent (D) to form a pigment dispersion solution, and then mixing the rest of the colorant (E), the alkali-soluble resin (A), the compound (B) containing an ethylenically-unsaturated group, the photoinitiator (C), and the solvent (D). Moreover, the dispersion steps of the colorant (E) can be performed by mixing with a mixer such as a beads mill or a roll mill.

<Manufacturing Method of Color Filter>

The manufacturing method of the color filter includes forming a black matrix, a pixel layer, a protective film, an ITO protective film, and a liquid crystal alignment film on a substrate in order. The methods for manufacturing the black matrix, the pixel layer, the protective film, the ITO protective film, and the liquid crystal alignment film using the photosensitive resin composition are respectively described below.

1. Manufacturing Method of Black Matrix

The black matrix is obtained by applying the treatments of pre-bake, exposure, development, and post-bake to the photosensitive resin composition containing the black pigment (E-2) in order. The black matrix is used for isolating each pixel layer. Moreover, when the film thickness of the black matrix is 1 μm, the range of the optical density can be at least 3.0, preferably 3.2 to 5.5, and more preferably 3.5 to 5.5. The manufacturing method of the black matrix is described below.

First, the photosensitive resin composition in liquid state is uniformly coated on a substrate by a coating method such as spin coating or cast coating to form a coating film. Specific examples of the substrate include alkali-free glass, soda-lime glass, hard glass (Pyrex glass), silica glass, and glasses with a transparent conductive film attached thereto used for a liquid crystal display apparatus. Alternatively, the substrate can be a substrate (such as a silicon substrate) used for a photoelectric conversion apparatus such as a solid imaging device.

After the coating film is formed, most of the solvent is removed by drying under reduced pressure. Next, the remaining solvent is completely removed by a pre-bake method to form a pre-baked coating film. It should be mentioned that, the conditions for drying under reduced pressure and pre-bake vary according to the type and ratio of each component. In general, drying under reduced pressure is performed at a pressure less than 200 mmHg for 1 second to 20 seconds, and the pre-bake is a heat treatment performed on the coating at a temperature of 70° C. to 110° C. for 1 minute to 15 minutes.

Then, the pre-baked coating film is exposed with a photomask having a specific pattern. The light used in the exposure process is preferably an ultraviolet light such as a g-ray, h-ray, or i-ray. In addition, the ultraviolet light irradiation apparatus can be a(n) (ultra-)high pressure mercury vapor lamp or a metal halide lamp.

Then, the exposed pre-baked coating film is immersed in a developing solution at a temperature of 23±2° C. to remove the unexposed portion of the pre-baked coating film and to form a specific pattern on the substrate.

The developing solution is, for instance, an alkali compound such as sodium hydroxide, potassium hydroxide, sodium carbonate, sodium hydrogen carbonate, potassium carbonate, potassium hydrogen carbonate, sodium silicate, sodium methyl silicate, ammonia solution, ethylamine, diethylamine, dimethylethylanolamine, tetramethylammonium hydroxide, tetraethylammonium hydroxide, choline, pyrrole, piperidine, or 1,8-diazabicyclo-[5,4,0]-7-undecene. The concentration of the developing solution is generally 0.001 wt % to 10 wt %, preferably 0.005 wt % to 5 wt %, and more preferably 0.01 wt % to 1 wt %.

After the pre-baked coating film is developed, the substrate having a specific pattern is rinsed with water, and then the specific pattern is air dried with compressed air or compressed nitrogen. Then, a post-bake treatment is performed with a heating device such as a hot plate or an oven. The post-bake temperature is generally 150° C. to 250° C., wherein when a hot plate is used, the heating time is 5 minutes to 60 minutes, and when an oven is used, the heating time 15 minutes to 150 minutes. After the treatment steps, a black matrix can be formed on the substrate.

2. Manufacturing Method of Pixel Layer

The manufacturing method the pixel layer is similar to the manufacturing method the black matrix. Specifically, the pixel layer is obtained by coating the photosensitive composition containing the first colorant (E-1) on the substrate with a black matrix formed thereon, and then applying the treatments of pre-bake, exposure, development, and post-bake in order. However, drying under reduced pressure is performed at a pressure of 0 mmHg to 200 mmHg for 1 second to 60 seconds. After the treatment steps, a specific pattern can be fixed, thereby forming the pixel layer. Moreover, the steps above are repeated to form pixel layers of, for instance, red, green, and blue on the substrate in order.

3. Manufacturing Method of Protective Film

The protective film is obtained by coating a photosensitive composition without the colorant (E) on the substrate with a black matrix and a pixel layer formed thereon, and then applying the treatments of pre-bake, exposure, and post-bake in order. The manufacturing method the protective film is described below.

The photosensitive resin composition in liquid state is uniformly coated on the substrate with a black matrix and a pixel layer formed thereon to form a coating film. The coating method is, for instance, a spray method, roller coating method, spin coating method, bar coating method, or inkjet method. The coating method can utilize a spin coater, spinless coating machine, or slit-die coating machine.

Then, pre-bake is performed on the coating film. The conditions for pre-bake vary according to the type of each component and the mixing ratio. In general, the pre-bake is performed at a temperature of 70° C. to 90° C. for 1 minute to 15 minutes. After the pre-bake, the thickness of the pre-baked coating film is 0.15 µm to 8.5 µm, preferably 0.15 µm to 6.5 µm, and more preferably 0.15 µm to 4.5 µm. The thickness of the pre-baked coating film is the thickness after the solvent is removed.

Then, an exposure treatment is performed on the pre-baked coating film. The light used for the exposure treatment is, for instance, visible light, ultraviolet light, far ultraviolet light, electron beam, or X-ray. However, ultraviolet light with a wavelength of 190 nm to 450 nm is preferred. The exposure amount of the exposure treatment can be 100 $J/m^2$ to 20,000 $J/m^2$, and is preferably 150 $J/m^2$ to 10,000 $J/m^2$.

Then, a heat treatment is performed on the pre-baked coating film after the exposure treatment with a heating apparatus such as a hot plate or an oven. The temperature of the heat treatment is generally 150° C. to 250° C. When a hot plate is used, the heating time is 5 minutes to 30 minutes, and when an oven is used, the heating time is 30 minutes to 90 minutes. After the treatment steps, a protective film can be formed on the substrate on which a black matrix and a pixel layer are formed.

4. Manufacturing Method ITO Protective Film and Liquid Crystal Alignment Film

An ITO protective film (evaporated film) is formed on the surface of the pixel layer via sputtering in a vacuum environment at a temperature of 220° C. to 250° C. When needed, the ITO protective film is etched and wired, and a liquid crystal alignment film (polyimide for liquid crystal alignment film) is coated on the surface of the ITO protective film to form a color filter.

<Manufacturing Method of Liquid Crystal Display Apparatus>

First, the color filter formed by the method for forming a color filter and a substrate provided with a thin film transistor (TFT) are disposed opposite to each other, and a gap (cell gap) is left between the two. Then, the color filter and the peripheral portion of the substrate are laminated with an adhesive and an injection hole is left. Then, liquid crystal is injected into the gap separated by the substrate surface and the adhesive through the injection hole. Lastly, the injection hole is sealed to form a liquid crystal layer. Then, a polarizer is provided to each of the other side of the color filter in contact with the liquid crystal layer and the other side of the substrate in contact with the liquid crystal layer to form a liquid crystal display. The liquid crystal used, i.e., a liquid crystal compound or a liquid crystal composition, is not particularly limited. Any liquid crystal compound or liquid crystal composition can be used.

Moreover, the liquid crystal alignment film used in the production of the color filter is used to limit the alignment of the liquid crystal molecules and is not particularly limited. Both inorganic matter and organic matter can be used, and the invention is not limited thereto.

The following examples are used to further describe the invention. However, it should be understood that, the examples are only exemplary, and are not intended to limit the implementation of the invention.

EXAMPLES

Preparation Examples of Diol Compound (a-1) Containing a Polymerizable Unsaturated Group Preparation Example 1

100 parts by weight of a fluorene epoxy compound (ESF-300 made by Nippon Steel Chemical; epoxy equivalent of 231), 30 parts by weight of acrylic acid, 0.3 parts by weight of benzyltriethylammonium chloride, 0.1 parts by weight of 2,6-di-t-butyl-p-cresol, and 130 parts by weight of propylene glycol monomethyl ether acetate were added continuously to a 500 mL 4-neck flask. The feeding rate was controlled at 25 parts by weight/minute. The temperature of the reaction process was maintained at 100° C. to 110° C. and the reaction lasted 15 hours. A yellowish transparent mixture having a solid component content of 50 wt % was thus obtained. After steps of extraction, filtering, and heating and drying, a diol compound (a-1-1) containing a polymerizable unsaturated group having a solid component content of 99.9 wt % was obtained.

Preparation Example 2

100 parts by weight of a fluorene epoxy compound (PG-100 made by Osaka Gas; epoxy equivalent of 259), 35 parts by weight of methacrylic acid, 0.3 parts by weight of benzyltriethylammonium chloride, 0.1 parts by weight of 2,6-di-t-butyl-p-cresol, and 135 parts by weight of propylene glycol monomethyl ether acetate were added continuously to a 500 mL 4-neck flask. The feeding rate was controlled at 25 parts by weight/minute. The temperature of the reaction process was maintained at 100° C. to 110° C. and the reaction lasted 15 hours. A yellowish transparent mixture having a solid component content of 50 wt % was thus obtained. After steps of extraction, filtering, and heating and drying, a diol compound (a-1-2) containing a polymerizable unsaturated group having a solid component content of 99.9 wt % was obtained.

Preparation Example 3

100 parts by weight of a fluorene epoxy compound (ESF-300 made by Nippon Steel Chemical; epoxy equivalent of 231), 100 parts by weight of 2-methacryloyloxyethyl succinate, 0.3 parts by weight of benzyltriethylammonium chloride, 0.1 parts by weight of 2,6-di-t-butyl-p-cresol, and 200 parts by weight of propylene glycol monomethyl ether acetate were added continuously to a 500 mL 4-neck flask. The feeding rate was controlled at 25 parts by weight/ minute. The temperature of the reaction process was maintained at 100° C. to 110° C. and the reaction lasted 15 hours. A yellowish transparent mixture having a solid component content of 50 wt % was thus obtained. After steps of extraction, filtering, and heating and drying, a diol compound (a-1-3) containing a polymerizable unsaturated group having a solid component content of 99.9 wt % was obtained.

Preparation Example 4

0.3 mol of 9,9-bis(4-hydroxy-3-methylphenyl)fluorene, 9 mol of epichlorohydrin, and 0.003 mol of tetramethyl ammonium chloride were added to a 1000 mL 3-neck flask equipped with a mechanical agitation device, a thermometer, and a reflux condenser. The mixture was heated to 105° C.

while stirring and reacted for 9 hours. The unreacted epichlorohydrin was distilled under reduced pressure. The reaction system was cooled to room temperature, and a 30 wt % aqueous solution formed by dissolving 9 mol of benzene and 0.5 mol of sodium hydroxide in water was added while stirring, and then the reaction system was heated to 60° C. and kept at 60° C. for 3 hours. Next, the reaction solution was repeatedly washed with water until no Cl⁻ remained (tested with AgNO₃). Lastly, the solvent benzene was distilled under reduced pressure and dried at 75° C. for 24 hours to obtain an epoxy compound of 9,9-bis(4-hydroxy-3-methylphenyl)fluorene.

100 parts by weight of an epoxy compound of 9,9-bis(4-hydroxy-3-methylphenyl)fluorene (epoxy equivalent of 181), 30 parts by weight of acrylic acid, 0.3 parts by weight of benzyltriethylammonium chloride, 0.1 parts by weight of 2,6-di-t-butyl-p-cresol, and 130 parts by weight of propylene glycol monomethyl ether acetate were added continuously to a 500 mL 4-neck flask. The feeding rate was controlled at 25 parts by weight/minute. The temperature of the reaction process was maintained at 100° C. to 110° C. and the reaction lasted 15 hours. A yellowish transparent mixture having a solid component content of 50 wt % was thus obtained. After steps of extraction, filtering, and heating and drying, a diol compound (a-1-4) containing a polymerizable unsaturated group having a solid component content of 99.9 wt % was obtained.

Preparation Example 5

0.3 mol of 9,9-bis(4-hydroxyphenyl)fluorene, 9 mol of epichlorohydrin, and 0.003 mol of tetramethyl ammonium chloride were added to a 1000 mL 3-neck flask equipped with a mechanical agitator, a thermometer, and a reflux condenser. The mixture was heated to 105° C. while stirring and reacted for 9 hours. The unreacted epichlorohydrin was distilled under reduced pressure. The reaction system was cooled to room temperature, and a 30 wt % aqueous solution formed by dissolving 9 mol of benzene and 0.5 mol of sodium hydroxide in water was added while stirring, and then the reaction system was heated to 60° C. and kept at 60° C. for 3 hours. Next, the reaction solution was repeatedly washed with water until no Cl⁻ remained (tested with AgNO₃). Lastly, the solvent benzene was distilled under reduced pressure and dried at 75° C. for 24 hours to obtain an epoxy compound of 9,9-bis(4-hydroxyphenyl)fluorene.

100 parts by weight of an epoxy compound of 9,9-bis(4-hydroxyphenyl) fluorene (epoxy equivalent of 224), 35 parts by weight of methacrylic acid, 0.3 parts by weight of benzyltriethylammonium chloride, 0.1 parts by weight of 2,6-di-t-butyl-p-cresol, and 135 parts by weight of propylene glycol monomethyl ether acetate were added continuously to a 500 mL 4-neck flask. The feeding rate was controlled at 25 parts by weight/minute. The temperature of the reaction process was maintained at 100° C. to 110° C. and the reaction lasted 15 hours. A yellowish transparent mixture having a solid component content of 50 wt % was thus obtained. After steps of extraction, filtering, and heating and drying, a diol compound (a-1-5) containing a polymerizable unsaturated group having a solid component content of 99.9 wt % was obtained.

Preparation Example 6

0.3 mol of 9,9-bis(4-hydroxy-3-chlorophenyl)fluorene, 9 mol of epichlorohydrin, and 0.003 mol of tetramethyl ammonium chloride were added to a 1000 mL 3-neck flask equipped with a mechanical agitator, a thermometer, and a reflux condenser. The mixture was heated to 105° C. while stirring and reacted for 9 hours. The unreacted epichlorohydrin was distilled under reduced pressure. The reaction system was cooled to room temperature, and a 30 wt % aqueous solution formed by dissolving 9 mol of benzene and 0.5 mol of sodium hydroxide in water was added while stirring, and then the reaction system was heated to 60° C. and kept at 60° C. for 3 hours. Next, the reaction solution was repeatedly washed with water until no Cl⁻ remained (tested with AgNO₃). Lastly, the solvent benzene was distilled under reduced pressure and dried at 75° C. for 24 hours to obtain an epoxy compound of 9,9-bis(4-hydroxy-3-chlorophenyl)fluorene.

100 parts by weight of an epoxy compound of 9,9-bis(4-hydroxy-3-chlorophenyl)fluorene (epoxy equivalent of 278), 100 parts by weight of 2-methacryloyloxyethyl succinate, 0.3 parts by weight of benzyltriethylammonium chloride, 0.1 parts by weight of 2,6-di-t-butyl-p-cresol, and 200 parts by weight of propylene glycol monomethyl ether acetate were added continuously to a 500 mL 4-neck flask. The feeding rate was controlled at 25 parts by weight/minute. The temperature of the reaction process was maintained at 100° C. to 110° C. and the reaction lasted 15 hours. A yellowish transparent mixture having a solid component content of 50 wt % was thus obtained. After steps of extraction, filtering, and heating and drying, a diol compound (a-1-6) containing a polymerizable unsaturated group having a solid component content of 99.9 wt % was obtained.

Synthesis Examples of Alkali-Soluble Resin (A)

Synthesis Examples of First Alkali-Soluble Resin A-1

In the following, synthesis example A-1-1 to synthesis example A-1-12 of the first alkali-soluble resin A-1 are described:

Synthesis Example A-1-1

1.0 mol of the diol compound (a-1-1) containing a polymerizable unsaturated group, 1.9 g of benzyltriethylammonium chloride, and 0.6 g of 2,6-di-tert-butyl-p-cresol were dissolved in 1000 g of propylene glycol monomethyl ether acetate, and 0.1 mol of 3,3',4,4'-biphenyl tetracarboxylic dianhydride (hereinafter a-2-1) and 1.8 mol of 2-isocyanatoethyl methacrylate (hereinafter a-3-1) were added at the same time. The mixture was heated to 110° C. and reacted for 2 hours (simultaneous addition) to obtain a first alkali-soluble resin (hereinafter A-1-1) having an acid value of 9 mgKOH/g, a weight-average molecular weight of 906, and an unsaturated equivalent of 230.

Synthesis Example A-1-2 to Synthesis Example A-1-12

The first alkali-soluble resins of synthesis example A-1-2 to synthesis example A-1-12 were prepared with the same steps as synthesis example 1, and the difference thereof is: the type, usage amount, reaction time, reaction temperature, and addition time of the reactants of each of the components of the first alkali-soluble resins were changed (shown in Table 1). It should be mentioned that, here, "simultaneous" refers to adding the tetracarboxylic acid or an acid dianhydride thereof (a-2), the compound (a-3) containing a polymerizable unsaturated group and an isocyanate group, and the other compounds (a-4) at the same reaction time (i.e., simultaneous addition), and "successive" refers to adding the tetracarboxylic acid or an acid dianhydride thereof (a-2), the compound (a-3) containing a polymerizable unsaturated group and an isocyanate group, and the other compounds (a-4) at different reaction times, i.e., the tetracarboxylic acid or an acid dianhydride thereof (a-2) is added first, and then the compound (a-3) containing a polymerizable unsaturated group and an isocyanate group and the other compounds (a-4) are added (i.e., successive addition).

The compounds corresponding to the labels in Tables 1 and 2 are shown below.

| Abbreviation | Component |
|---|---|
| a-1-1 | Diol compound (a-1-1) containing a polymerizable unsaturated group of preparation example 1 |
| a-1-2 | Diol compound (a-1-2) containing a polymerizable unsaturated group of preparation example 2 |
| a-1-3 | Diol compound (a-1-3) containing a polymerizable unsaturated group of preparation example 3 |

-continued

| Abbreviation | Component |
|---|---|
| a-1-4 | Diol compound (a-1-4) containing a polymerizable unsaturated group of preparation example 4 |
| a-1-5 | Diol compound (a-1-5) containing a polymerizable unsaturated group of preparation example 5 |
| a-1-6 | Diol compound (a-1-6) containing a polymerizable unsaturated group of preparation example 6 |
| a-2-1 | 3,3',4,4'-biphenyl tetracarboxylic dianhydride |
| a-2-2 | 3,3',4,4'-benzophenone tetracarboxylic dianhydride |
| a-2-3 | 3,3',4,4'-oxydiphenyltetracarboxylic dianhydride |
| a-3-1 | 2-isocyanatoethyl methacrylate |
| a-3-2 | 2-isocyanatoethyl acrylate |
| a-3-3 | 2-isocyanatopropyl acrylate |
| a-3-4 | 2-isocyanatobutyl methacrylate |
| a-3-5 | 2-isocyanatohexyl acrylate |
| a-3-6 | 2-isocyanatopentyl acrylate |
| a-4-1 | Butanedioic anhydride |
| a-4-2 | Phthalic anhydride |
| a-4-3 | Tetrahydrophthalic anhydride |
| PGMEA | Propylene glycol monomethyl ether acetate (PGMEA) |
| EEP | Ethyl 3-ethoxypropionate (EEP) |
| — | Benzyltriethylammonium chloride |
| — | 2,6-di-tert-butyl-p-cresol |

TABLE 1

| Synthesis example | | | A-1-1 | A-1-2 | A-1-3 | A-1-4 | A-1-5 | A-1-6 | A-1-7 |
|---|---|---|---|---|---|---|---|---|---|
| Components for polymerization | (a-1) Component (mol) | a-1-1 | 1.00 | 1.00 | 1.00 | 1.00 | — | — | — |
| | | a-1-2 | — | — | — | — | 1.00 | — | — |
| | | a-1-3 | — | — | — | — | — | 1.00 | — |
| | | a-1-4 | — | — | — | — | — | — | 1.00 |
| | | a-1-5 | — | — | — | — | — | — | — |
| | | a-1-6 | — | — | — | — | — | — | — |
| | (a-2) Component (mol) | a-2-1 | 0.10 | — | — | — | 0.30 | — | — |
| | | a-2-2 | — | 1.00 | — | 1.00 | — | — | 0.50 |
| | | a-2-3 | — | — | 0.20 | — | — | 0.40 | — |
| | (a-3) Component (mol) | a-3-1 | 1.80 | — | — | — | — | — | — |
| | | a-3-2 | — | 0.01 | — | 0.02 | — | 0.60 | 0.50 |
| | | a-3-3 | — | — | 1.60 | — | — | — | — |
| | | a-3-4 | — | — | — | — | 1.40 | — | 0.30 |
| | | a-3-5 | — | — | — | — | — | 0.60 | — |
| | | a-3-6 | — | — | — | — | — | — | — |
| | (a-4) Component (mol) | a-4-1 | — | — | — | — | — | — | 0.10 |
| | | a-4-2 | — | — | — | — | — | — | — |
| | | a-4-3 | — | — | — | — | — | — | — |
| Monomer feeding method | | | Simultaneous | Simultaneous | Successive | Simultaneous | Simultaneous | Successive | Simultaneous |
| Catalyst (g) | Benzyltriethylammonium chloride | | 1.9 | 0.5 | 2.9 | 0.4 | 1.5 | 0.4 | 2.5 |
| Inhibitor (g) | 2,6-di-t-butyl-p-cresol | | 0.6 | 0.6 | 0.6 | 1.4 | 1.0 | 0.6 | 0.7 |
| Solvent (g) | PGMEA | | 1000 | 600 | 900 | 600 | 1000 | 800 | — |
| | EEP | | — | — | — | — | 100 | — | 800 |
| (a-2)/(a-1) | | | 0.10 | 1.00 | 0.20 | 1.00 | 0.30 | 0.40 | 0.50 |
| (a-3)/(a-1) | | | 1.80 | 0.01 | 1.60 | 0.02 | 1.40 | 1.20 | 0.80 |
| Reaction temperature (° C.) | | | 110 | 110 | 110 | 90 | 115 | 95 | 110 |
| Reaction time (hours) | | | 2 | 4 | 2 4 | 4 | 1.5 | 2 4 | 2 |
| Acid value (mgKOH/g) | | | 9 | 150 | 11 | 147 | 30 | 51 | 80 |
| Mw | | | 906 | 31000 | 1050 | 29789 | 2070 | 4170 | 6010 |
| Unsaturated equivalent | | | 230 | 1100 | 242 | 990 | 304 | 354 | 470 |

| Synthesis example | | | A-1-8 | A-1-9 | A-1-10 | A-1-11 | A-1-12 |
|---|---|---|---|---|---|---|---|
| Components for polymerization | (a-1) Component (mol) | a-1-1 | — | — | — | — | 1.00 |
| | | a-1-2 | 0.50 | — | — | — | — |
| | | a-1-3 | 0.50 | — | — | — | — |
| | | a-1-4 | — | 1.00 | — | — | — |
| | | a-1-5 | — | — | 1.00 | — | — |
| | | a-1-6 | — | — | — | 1.00 | — |
| | (a-2) Component (mol) | a-2-1 | — | 0.40 | — | 0.50 | — |
| | | a-2-2 | — | — | 0.80 | 0.40 | — |
| | | a-2-3 | 0.60 | 0.30 | — | — | 1.10 |
| | (a-3) Component (mol) | a-3-1 | — | 0.30 | — | — | — |
| | | a-3-2 | — | — | 0.10 | — | — |
| | | a-3-3 | 0.60 | — | — | — | — |

TABLE 1-continued

| | | | | | | | |
|---|---|---|---|---|---|---|---|
| | | a-3-4 | — | 0.10 | — | — | 0.02 |
| | | a-3-5 | — | — | — | — | — |
| | | a-3-6 | — | — | — | 0.20 | — |
| | (a-4) | a-4-1 | — | — | — | — | — |
| | Component | a-4-2 | 0.20 | — | — | — | 0.10 |
| | (mol) | a-4-3 | — | — | 0.30 | — | — |
| Monomer feeding method | | | Successive | Simultaneous | Successive | Simultaneous | Simultaneous |
| Catalyst (g) | Benzyltriethylammonium chloride | | 2.4 | 2.0 | 0.6 | 1.1 | 2.5 |
| Inhibitor (g) | 2,6-di-t-butyl-p-cresol | | 0.8 | 0.4 | 0.4 | 0.4 | 0.6 |
| Solvent (g) | PGMEA | | 900 | 600 | 600 | 600 | 600 |
| | EEP | | — | — | — | — | — |
| (a-2)/(a-1) | | | 0.60 | 0.70 | 0.80 | 0.90 | 1.10 |
| (a-3)/(a-1) | | | 0.60 | 0.40 | 0.10 | 0.20 | 0.02 |
| Reaction temperature (° C.) | | | 90 | 115 | 95 | 110 | 90 |
| Reaction time (hours) | | | 2 3.5 | 2 | 2 3.5 | 2 | 4 |
| Acid value (mgKOH/g) | | | 115 | 120 | 149 | 139 | 160 |
| Mw | | | 9210 | 13921 | 19321 | 25010 | 29001 |
| Unsaturated equivalent | | | 610 | 751 | 869 | 903 | 954 |

Synthesis Examples of Second Alkali-Soluble Resin (A-2)

In the following, synthesis example A-2-1 to synthesis example A-2-3 of the second alkali-soluble resin (A-2) are described:

Synthesis Example A-2-1

1.0 mol of the diol compound (a-1-1) containing a polymerizable unsaturated group, 1.9 grams of benzyltriethylammonium chloride, and 0.6 grams of 2,6-di-tert-butyl-p-cresol were dissolved in 700 grams of propylene glycol monomethyl ether acetate, and 0.2 mol of 3,3',4,4'-biphenyl tetracarboxylic dianhydride (a-2-1) and 1.4 mol of succinic anhydride (a-4-1) were added at the same time. Then, the mixture was heated to 110° C. and reacted for 2 hours to obtain the second alkali-soluble resin (referred to as the second alkali-soluble resin A-2-1 below) of synthesis example A-2-1 having an acid value of 131 mgKOH/g and a weight-average molecular weight of 1085.

Synthesis Example A-2-2 to Synthesis Example A-2-3

The second alkali-soluble resins of synthesis example A-2-2 to synthesis example A-2-3 were prepared with the same steps as synthesis example A-2-1, and the difference thereof is: the type, usage amount, reaction time, reaction temperature, and addition time of the reactants of each of the components of the second alkali-soluble resins were changed (shown in Table 2). It should be mentioned that, here, "simultaneous addition" refers to adding the tetracarboxylic acid or an acid dianhydride thereof (a-2) and the dicarboxylic acid or an acid anhydride thereof (a-4) at the same reaction time, and "successive addition" refers to respectively adding the tetracarboxylic acid or an acid dianhydride thereof (a-2) and the dicarboxylic acid or an acid anhydride thereof (a-4) at different reaction times. That is, the tetracarboxylic acid or an acid dianhydride thereof (a-2) was added first, and then the dicarboxylic acid or an acid anhydride thereof (a-4) was added.

TABLE 2

| Synthesis example | | | A-2-1 | A-2-2 | A-2-3 |
|---|---|---|---|---|---|
| Components for polymerization | (a-1) component (mol) | a-1-1 | 1.0 | — | — |
| | | a-1-2 | — | 1.0 | — |
| | | a-1-3 | — | — | 1.0 |
| | | a-1-4 | — | — | — |
| | | a-1-5 | — | — | — |
| | | a-1-6 | — | — | — |
| | (a-2) component (mol) | a-2-1 | 0.2 | — | — |
| | | a-2-2 | — | 0.5 | — |
| | | a-2-3 | — | — | 1.0 |
| | (a-3) component (mol) | a-3-1 | — | — | — |
| | | a-3-2 | — | — | — |
| | | a-3-3 | — | — | — |
| | | a-3-4 | — | — | — |
| | | a-3-5 | — | — | — |
| | | a-3-6 | — | — | — |
| | (a-4) component (mol) | a-4-1 | 1.4 | — | — |
| | | a-4-2 | — | 1.0 | — |
| | | a-4-3 | — | — | — |
| Monomer feeding method | | | Simultaneous addition | Successive addition | Simultaneous addition |
| Catalyst (g) | Benzyltriethylammonium chloride | | 1.9 | 2.0 | 2.9 |
| Inhibitor (g) | 2,6-di-t-butyl-p-cresol | | 0.6 | 0.7 | 1.0 |
| Solvent (g) | PGMEA | | 700 | 600 | 600 |
| | EEP | | — | 200 | — |
| (a-2)/(a-1) | | | 0.2 | 0.5 | 1.0 |
| (a-3)/(a-1) | | | — | — | — |
| Reaction temperature (° C.) | | | 110 | 90 | 115 |
| Reaction time (hours) | | | 2 | 2 4 | 2 |
| Acid value (mgKOH/g) | | | 131 | 147 | 146 |
| Mw | | | 1085 | 6321 | 29888 |
| Unsaturated equivalent | | | 241 | 553 | 1090 |

Synthesis Examples of Other Alkali-Soluble Resins (A-3)

In the following, synthesis example A-3-1 to synthesis example A-3-3 of the other alkali-soluble resins (A-3) are described:

Synthesis Example A-3-1

A nitrogen inlet, stirrer, heater, condenser tube, and thermometer were provided to a four-necked flask having a volume of 1000 ml. After nitrogen was introduced, 15 parts by weight of acrylic acid (AA), 15 parts by weight of 2-hydroxyethyl methacrylate (HEMA), 70 parts by weight of benzyl methacrylate (BzMA), 3 parts by weight of 2,2'-azobis(2-methylbutyronitrile) (AMBN), and 300 parts by weight of diethylene glycol dimethyl ether (diglyme) were added. Then, the mixture was slowly stirred and the solution was heated to 80° C. Then, polycondensation was performed on the mixture at 80° C. for 6 hours. Then, after the solvent was evaporated, the other alkali-soluble resins (A-3-1) were obtained.

Synthesis Example A-3-2 to Synthesis Example A-3-3

The other alkali-soluble resins of synthesis example A-3-2 to synthesis example A-3-3 were prepared with the same steps as synthesis example A-3-1, and the difference thereof is: the type, usage amount, reaction time, reaction temperature, and addition time of the reactants of each of the components of the other alkali-soluble resins were changed (shown in Table 3).

The compounds corresponding to the labels in Table 3 are shown below:

| Abbreviation | Component |
|---|---|
| AMBN | 2,2'-azobis-2-methyl butyronitrile |
| ADVN | 2,2'-azobis(2,4-dimethylvaleronitrile) |
| MAA | Methacrylic acid |
| AA | Acrylic acid |
| GMA | Glycidyl methacylate |
| HEMA | 2-hydroxyethyl methacrylate |
| BzMA | Benzyl methacrylate |
| IBOMA | Isobornyl methacrylate |
| Diglyme | Diethylene glycol dimethyl ether |
| PGMEA | Propylene glycol monoethyl ether acetate |

TABLE 3

| Synthesis example | | A-3-1 | A-3-2 | A-3-3 |
|---|---|---|---|---|
| Monomer | MAA | — | 20 | 10 |
| (parts by weight) | AA | 15 | — | 20 |
| | GMA | — | — | 10 |
| | HEMA | 15 | 20 | — |
| | BzMA | 70 | — | 20 |
| | IBOMA | — | 60 | 40 |
| Solvent | Diglyme | 300 | — | 300 |
| (parts by weight) | PGMEA | — | 300 | — |
| Initiator | AMBN | 3 | 3 | — |
| (parts by weight) | ADVN | — | — | 2 |
| Reaction temperature (° C.) | | 80 | 80 | 80 |
| Polycondensation time (hours) | | 6 | 6 | 6 |

Examples of Photosensitive Resin Composition

Example 1 to example 19 and comparative example 1 to comparative example 7 of the photosensitive resin composition are described below:

Example 1

100 parts by weight of the first alkali-soluble resin (A-1-1), 20 parts by weight of trimethylolpropane triacrylate (hereinafter B-1), 10 parts by weight of ethanone,1-[9-ethyl-6-(2-methylbenzoyl)-9H-carbazole-3-yl]-,1-(O-acetyl oxime) (hereinafter C-1), and 50 parts by weight of C.I. pigment red 254/C.I. pigment yellow 139=80/20 (hereinafter E-1-1) were added in 1000 parts by weight of propylene glycol monomethyl ether acetate (hereinafter D-1), and after the mixture was evenly stirred with a shaking-type stirrer, the photosensitive resin composition of example 1 was obtained. The resulting photosensitive resin composition was evaluated by each of the following evaluation methods, and the results are shown in Table 4.

Example 2 to Example 19

The photosensitive resin compositions of example 2 to example 19 were prepared using the same steps as example 1, with the difference being: the type and the usage amount of the components of the photosensitive resin compositions were changed (shown in Tables 4 and 5), and the resulting photosensitive resin compositions were evaluated via each evaluation method below, and the results are shown in Tables 4 and 5.

Comparative Example 1 to Comparative Example 7

The photosensitive resin compositions of comparative example 1 to comparative example 7 were prepared using the same steps as example 1, and the difference thereof is: the type and the usage amount of the components of the photosensitive resin compositions were changed (shown in Table 6). The resulting photosensitive resin composition was evaluated by each of the following evaluation methods, and the results are shown in Table 6.

In particular, the compounds corresponding to the labels in Tables 4 to 6 are shown below.

| Abbreviation | Compound |
|---|---|
| A-1-1 | First alkali-soluble resin (A-1-1) of synthesis example A-1-1 |
| A-1-2 | First alkali-soluble resin (A-1-2) of synthesis example A-1-2 |
| A-1-3 | First alkali-soluble resin (A-1-3) of synthesis example A-1-3 |
| A-1-4 | First alkali-soluble resin (A-1-4) ot synthesis example A-1-4 |
| A-1-5 | First alkali-soluble resin (A-1-5) of synthesis example A-1-5 |
| A-1-6 | First alkali-soluble resin (A-1-6) of synthesis example A-1-6 |
| A-1-7 | First alkali-soluble resin (A-1-7) of synthesis example A-1-7 |
| A-1-8 | First alkali-soluble resin (A-1-8) of synthesis example A-1-8 |
| A-1-9 | First alkali-soluble resin (A-1-9) of synthesis example A-1-9 |
| A-1-10 | First alkali-soluble resin (A-1-10) of synthesis example A-1-10 |
| A-1-11 | First alkali-soluble resin (A-1-11) of synthesis example A-1-11 |
| A-1-12 | First alkali-soluble resin (A-1-12) of synthesis example A-1-12 |
| A-2-1 | Second alkali-soluble resin (A-2-1) of synthesis example A-2-1 |
| A-2-2 | Second alkali-soluble resin (A-2-2) of synthesis example A-2-2 |
| A-2-3 | Second alkali-soluble resin (A-2-3) of synthesis example A-2-3 |
| A-3-1 | Other alkali-soluble resins (A-3-1) of synthesis example A-3-1 |
| A-3-2 | Other alkali-soluble resins (A-3-2) of synthesis example A-3-2 |

-continued

| Abbreviation | Compound |
|---|---|
| A-3-3 | Other alkali-soluble resins (A-3-3) of synthesis example A-3-3 |
| B-1 | Trimethylolpropane triacrylate |
| B-2 | Dipentaerythritol tetracrylate |
| B-3 | Dipentaerythritol hexacrylate |
| C-1 | 1-[9-ethyl-6-(2-methylbenzoyl)-9H-carbazole-3-yl]-, 1-(O-acetyl oxime) (product name: OXE-02, made by Ciba Specialty Chemicals Co., Ltd.) |
| C-2 | 1-(4-phenyl-thio-phenyl)-octane-1,2-dion-2-oxime-O-benzoate (product name: OXE-01, made by Ciba Specialty Chemicals Co., Ltd.) |
| C-3 | 2-methyl-1-(4-methylthio phenyl)-2-morpholino-1-propanone (product name: IRGACURE 907, made by Ciba Specialty Chemicals Co., Ltd.) |
| D-1 | Propylene glycol monomethyl ether acetate |
| D-2 | Ethyl 3-ethoxypropionate |
| E-1-1 | C.I. pigment red 254/C.I. pigment yellow 139 = 80/20 |
| E-1-2 | C.I. pigment green 36/C.I. pigment yellow 150 = 60/40 |
| E-1-3 | C.I. pigment blue 15: 6 |
| E-2-1 | C.I. pigment black 7 |
| E-2-2 | MA100 (made by Mitsubishi Chemical) |
| F-1 | SF-8427 (made by Dow Corning Toray Co., Ltd., surfactant) |
| F-2 | 3-glycidoxypropyltrimethoxysilane (product name: KBM403, made by Shin-Etsu Chemical, adhesion promoter) |

TABLE 4

| Examples | | | 1 | 2 | 3 | 4 | 5 | 6 | 7 | 8 | 9 | 10 |
|---|---|---|---|---|---|---|---|---|---|---|---|---|
| Alkali-soluble resin (A) (parts by weight) | A-1 | A-1-1 | 100 | — | 100 | — | — | — | — | — | — | — |
| | | A-1-2 | — | 100 | — | 100 | — | — | — | — | — | — |
| | | A-1-3 | — | — | — | — | 100 | — | — | — | — | — |
| | | A-1-4 | — | — | — | — | — | 100 | — | — | — | — |
| | | A-1-5 | — | — | — | — | — | — | 100 | — | — | — |
| | | A-1-6 | — | — | — | — | — | — | — | 100 | — | — |
| | | A-1-7 | — | — | — | — | — | — | — | — | 100 | — |
| | | A-1-8 | — | — | — | — | — | — | — | — | — | 100 |
| | | A-1-9 | — | — | — | — | — | — | — | — | — | — |
| | | A-1-10 | — | — | — | — | — | — | — | — | — | — |
| | | A-1-11 | — | — | — | — | — | — | — | — | — | — |
| | | A-1-12 | — | — | — | — | — | — | — | — | — | — |
| | A-2 | A-2-1 | — | — | — | — | — | — | — | — | — | — |
| | | A-2-2 | — | — | — | — | — | — | — | — | — | — |
| | | A-2-3 | — | — | — | — | — | — | — | — | — | — |
| | A-3 | A-3-1 | — | — | — | — | — | — | — | — | — | — |
| | | A-3-2 | — | — | — | — | — | — | — | — | — | — |
| | | A-3-3 | — | — | — | — | — | — | — | — | — | — |
| Compound (B) containing an ethylenically-unsaturated group (parts by weight) | B-1 | | 20 | — | — | — | — | — | 50 | — | — | 50 |
| | B-2 | | — | 150 | 50 | — | 30 | — | — | 60 | 40 | — |
| | B-3 | | — | — | 50 | 80 | — | 40 | — | — | 30 | 40 |
| Photoinitiator (C) (parts by weight) | C-1 | | 10 | — | — | 50 | — | — | 40 | — | — | 70 |
| | C-2 | | — | 90 | — | 10 | 20 | — | — | 50 | — | — |
| | C-3 | | — | — | 50 | — | — | 30 | — | — | 60 | — |
| Solvent (D) (parts by weight) | D-1 | | 1000 | 6000 | — | 3000 | 1500 | — | 3000 | 2000 | 5000 | — |
| | D-2 | | — | 1500 | 4000 | — | — | 2000 | — | 2000 | — | 6000 |
| Colorant (E) (parts by weight) | E-1 | E-1-1 | 50 | — | — | — | — | — | 450 | — | — | — |
| | | E-1-2 | — | — | — | — | — | 350 | — | — | — | 200 |
| | | E-1-3 | — | — | — | — | — | — | — | — | 500 | — |
| | E-2 | E-2-1 | — | 800 | — | — | — | — | — | 200 | — | — |
| | | E-2-2 | — | — | — | — | 100 | — | — | — | — | — |
| Additive (F) (parts by weight) | F-1 | | — | — | — | — | — | 0.1 | — | — | — | 10 |
| | F-2 | | — | 5 | — | — | — | — | — | — | — | — |
| Evaluation results | Development residue | | ○ | ◎ | ○ | ◎ | ◎ | ◎ | ◎ | ◎ | ◎ | ◎ |
| | Sputtering resistance | | ○ | ○ | ○ | ○ | ◎ | ◎ | ◎ | ◎ | ◎ | ◎ |

TABLE 5

| Examples | | | 11 | 12 | 13 | 14 | 15 | 16 | 17 | 18 | 19 |
|---|---|---|---|---|---|---|---|---|---|---|---|
| Alkali-soluble resin (A) (parts by weight) | A-1 | A-1-1 | — | — | — | — | — | — | — | — | — |
| | | A-1-2 | — | — | — | — | — | — | — | — | — |
| | | A-1-3 | — | — | — | — | — | — | 50 | — | — |

TABLE 5-continued

| Examples | | | 11 | 12 | 13 | 14 | 15 | 16 | 17 | 18 | 19 |
|---|---|---|---|---|---|---|---|---|---|---|---|
| | | A-1-4 | — | — | — | — | — | — | — | 60 | — |
| | | A-1-5 | — | — | — | — | — | — | — | — | 90 |
| | | A-1-6 | — | — | — | — | 10 | — | — | — | — |
| | | A-1-7 | — | — | — | — | — | — | — | — | — |
| | | A-1-8 | — | — | — | — | — | — | — | — | — |
| | | A-1-9 | 100 | — | — | — | — | — | 10 | — | — |
| | | A-1-10 | — | 100 | — | — | — | — | — | 10 | — |
| | | A-1-11 | — | — | 100 | — | — | 20 | — | — | — |
| | | A-1-12 | — | — | — | 100 | — | — | — | — | — |
| | A-2 | A-2-1 | — | — | — | — | 50 | — | — | 20 | — |
| | | A-2-2 | — | — | — | — | — | 70 | — | — | 10 |
| | | A-2-3 | — | — | — | — | 40 | — | 20 | — | — |
| | A-3 | A-3-1 | — | — | — | — | — | — | 20 | — | — |
| | | A-3-2 | — | — | — | — | — | — | — | 10 | — |
| | | A-3-3 | — | — | — | — | — | — | 10 | — | — |
| Compound (B) containing an ethylenically-unsaturated group (parts by weight) | B-1 | | 100 | — | — | — | 35 | — | — | 145 | — |
| | B-2 | | 20 | 130 | — | 150 | — | 105 | — | — | 150 |
| | B-3 | | — | — | 140 | — | — | — | 85 | — | — |
| Photoinitiator (C) (parts by weight) | C-1 | | — | 50 | 10 | — | — | — | 55 | — | — |
| | C-2 | | 40 | 40 | — | 35 | — | 75 | — | 45 | 50 |
| | C-3 | | 40 | — | 5 | — | 25 | — | — | — | — |
| Solvent (D) (parts by weight) | D-1 | | 4500 | — | 6000 | 7000 | 2500 | 5000 | 500 | 7000 | — |
| | D-2 | | — | 3500 | — | 500 | — | 1000 | 5000 | — | 5000 |
| Colorant (E) (parts by weight) | E-1 | E-1-1 | — | — | — | 800 | — | — | — | — | — |
| | | E-1-2 | — | — | 700 | — | 300 | — | — | — | — |
| | | E-1-3 | — | 600 | — | — | — | — | — | — | 300 |
| | E-2 | E-2-1 | — | — | — | — | — | — | 500 | — | — |
| | | E-2-2 | 400 | — | — | — | — | — | — | — | — |
| Additive (F) (parts by weight) | F-1 | | — | — | — | — | — | — | — | — | — |
| | F-2 | | — | — | — | — | — | — | — | — | — |
| Evaluation results | Development residue | | ◎ | ◎ | ◎ | ◎ | ◎ | ◎ | ◎ | ◎ | ◎ |
| | Sputtering resistance | | ◎ | ◎ | ◎ | ○ | ◎ | ◎ | ◎ | ◎ | ◎ |

TABLE 6

| Comparative example | | | 1 | 2 | 3 | 4 | 5 | 6 | 7 |
|---|---|---|---|---|---|---|---|---|---|
| Alkali-soluble resin (A) (parts by weight) | A-1 | A-1-1 | — | — | — | — | — | — | — |
| | | A-1-2 | — | — | — | — | — | — | — |
| | | A-1-3 | — | — | — | — | — | — | — |
| | | A-1-4 | — | — | — | — | — | — | — |
| | | A-1-5 | — | — | — | — | — | — | — |
| | | A-1-6 | — | — | — | — | — | — | — |
| | | A-1-7 | — | — | — | — | — | — | — |
| | | A-1-8 | — | — | — | — | — | — | — |
| | | A-1-9 | — | — | — | — | — | — | — |
| | | A-1-10 | — | — | — | — | — | — | — |
| | | A-1-11 | — | — | — | — | — | — | — |
| | | A-1-12 | — | — | — | — | — | — | — |
| | A-2 | A-2-1 | 100 | — | — | — | — | — | — |
| | | A-2-2 | — | 100 | — | — | — | — | — |
| | | A-2-3 | — | — | 100 | — | — | — | 40 |
| | A-3 | A-3-1 | — | — | — | 100 | — | — | 60 |
| | | A-3-2 | — | — | — | — | 100 | — | — |
| | | A-3-3 | — | — | — | — | — | 100 | — |
| Compound (B) containing an ethylenically-unsaturated group (parts by weight) | B-1 | | — | 50 | — | — | — | 100 | — |
| | B-2 | | 50 | — | — | 40 | 150 | 20 | — |
| | B-3 | | 50 | — | 40 | 30 | — | — | 85 |
| Photoinitiator (C) (parts by weight) | C-1 | | — | 40 | — | — | — | — | 55 |
| | C-2 | | — | — | — | — | 90 | 40 | — |
| | C-3 | | 50 | — | 30 | 60 | — | 40 | — |
| Solvent (D) (parts by weight) | D-1 | | — | 3000 | — | 5000 | 6000 | 4500 | 500 |
| | D-2 | | 4000 | — | 2000 | — | 1500 | — | 5000 |
| Colorant (E) (parts by weight) | E-1 | E-1-1 | — | 450 | — | — | — | — | — |
| | | E-1-2 | — | — | 350 | — | — | — | — |
| | | E-1-3 | — | — | — | 500 | — | — | — |
| | E-2 | E-2-1 | — | — | — | — | 800 | — | 500 |
| | | E-2-2 | — | — | — | — | — | 400 | — |

TABLE 6-continued

| Comparative example | | 1 | 2 | 3 | 4 | 5 | 6 | 7 |
|---|---|---|---|---|---|---|---|---|
| Additive (F) (parts by weight) | F-1 | — | — | — | — | — | — | — |
| | F-2 | — | — | — | — | — | — | — |
| Evaluation results | Development residue | Δ | Δ | Δ | Δ | Δ | Δ | Δ |
| | Sputtering resistance | X | X | X | X | X | X | X |

<Evaluation Methods>
Development Residue of Pattern

The photosensitive resin composition of each example and comparative example was coated on two sets of 100 mm×100 mm glass substrates via a spin coating method. Then, the glass substrate was dried at a reduced pressure of about 100 mmHg for about 30 seconds. Next, the two sets of glass substrates were pre-baked at 80° C. for 3 minutes to form a pre-baked coating film having a film thickness of 2.5 μm. The two sets of pre-baked coating films were placed under photomasks having different line widths, and the pre-baked coating films were irradiated with an exposure amount sufficient to form a 20 μm line width. Next, the two sets of pre-baked coating films were respectively immersed in a developing solution (0.04% potassium hydroxide) at 23° C. for 40 seconds and 80 seconds to remove the portion of the pre-baked coating films not irradiated by UV light. Next, after washing with pure water, a post-bake treatment was performed at 230° C. in an oven for 60 minutes. Next, the presence of development residue at the edge of the two sets of patterns was observed via a microscope (made by Nikon, model: Eclipse 50i) and a scanning electronic microscope (made by Hitachi, model: S-3000N), and the evaluation method thereof is shown in Table 7:

TABLE 7

| | Development time (seconds) | |
|---|---|---|
| Evaluation | 40 | 80 |
| ⊚ | No significant residue | No significant residue |
| ○ | Some residue | No significant residue |
| Δ | Significant residue | Some residue |
| X | Significant residue | Significant residue |

Sputtering Resistance

The photosensitive resin composition made in each example and comparative example was coated on a glass substrate having a size of 100 mm×100 mm via a spin coating method. Next, drying under reduced pressure was performed, and the pressure thereof was 100 mmHg and the duration was 30 seconds. Next, a pre-bake process was performed, and the temperature thereof was 80° C. and the duration was 2 minutes to form a pre-baked coating film having a film thickness of 2.5 After the pre-bake process was performed, the pre-baked coating film was irradiated with 60 mJ/cm² of UV light (exposure machine: Canon PLA-501F) and the exposed pre-baked coating film was immersed in a developing solution at 23° C. After 1 minute, the coating film was washed with pure water and post-baked at 230° C. for 30 minutes to form a pattern on the glass substrate.

Next, the chromaticity (L*, a*, b*) of the pattern was measured via a chromometer (made by Otsuka Electronics, model: MCPD), and then an ITO film having a film resistance of 14.6 Ω/sq and a thickness of 2040 Å was formed on the pattern by sputtering at a sputtering temperature of 220° C. Next, the chroma of the pattern having the ITO film was measured via the colorimeter, and chroma variation (ΔEab*) was calculated via formula (12). A smaller chroma variation (ΔEab*) indicates better sputtering resistance. Evaluation was performed according to the following evaluation standard.

$$\Delta Eab^* = [(\Delta L)^2 + (\Delta a)^2 + (\Delta b)^2]^{1/2} \quad \text{Formula (12)}$$

⊚: Eab*<1;
○: 1≤ΔEab*<3;
Δ: 3≤ΔEab*<5;
X: ΔEab*≥5.

<Evaluation Results>

It can be known from Table 4 to Table 6 that, the pattern formed by the photosensitive resin composition containing the first alkali-soluble resin (A-1) having a specific structure (example 1 to example 19) has no development residue and good sputtering resistance.

Moreover, since the liquid crystal alignment agents of comparative example 1 to comparative example 7 do not have a specific first alkali-soluble resin (A-1), the patterns formed by the photosensitive resin compositions of comparative example 1 to comparative example 7 have development residue and poor sputtering resistance.

Moreover, in the mixture of the first alkali-soluble resin (A-1) formed by the reaction, when the molar ratio (a-2)/(a-1) of the (a-1) component and the (a-2) component is 0.2 to 1.0 (examples 2, 4 to 13, and 15 to 19), development residue of the pattern formed by the photosensitive resin composition can be further reduced, and the sputtering resistance of the resulting pattern is better.

Moreover, in the mixture of the first alkali-soluble resin (A-1) formed by the reaction, when the molar ratio (a-3)/(a-1) of the (a-1) component and the (a-3) component is 0.02 to 1.6 (examples 5 to 19), the sputtering resistance of the pattern formed by the photosensitive resin composition is better.

Moreover, when the weight-average molecular weight of the first alkali-soluble resin (A-1) is within a specific range (examples 5 to 19), or the unsaturated equivalent is within a specific range (examples 5 to 19), the pattern formed by the photosensitive resin composition has better sputtering resistance.

Moreover, when the acid value of the first alkali-soluble resin (A-1) is within a specific range (examples 2, 4 to 13, and 15 to 19), development residue of the pattern formed by the photosensitive resin composition can be further reduced, and the resulting pattern has better sputtering resistance.

Based on the above, the photosensitive resin composition of the invention contains the first alkali-soluble resin (A-1) having a specific structure, and therefore when used to form a color filter, the issues of development residue and poor sputtering resistance can be alleviated at the same time, such that the photosensitive resin composition is suitable for the manufacture of a black matrix, pixel layer, and protective film of the color filter.

Moreover, in the mixture of the first alkali-soluble resin (A-1) in the photosensitive resin composition of the invention formed by the reaction, when the molar ratio of specific components is within a specific range, the issue of development residue can be further alleviated, and the resulting pattern has better sputtering resistance.

Moreover, when the weight-average molecular weight, unsaturated equivalent, or acid value of the first alkali-soluble resin (A-1) in the photosensitive resin composition is within a specific range, the issue of development residue can also be further alleviated, and the resulting pattern has better sputtering resistance.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A photosensitive resin composition, comprising:
   an alkali-soluble resin (A);
   a compound (B) containing an ethylenically-unsaturated group;
   a photoinitiator (C); and
   a solvent (D),
   wherein the alkali-soluble resin (A) comprises a first alkali-soluble resin (A-1), and the first alkali-soluble resin (A-1) is represented by formula (1):

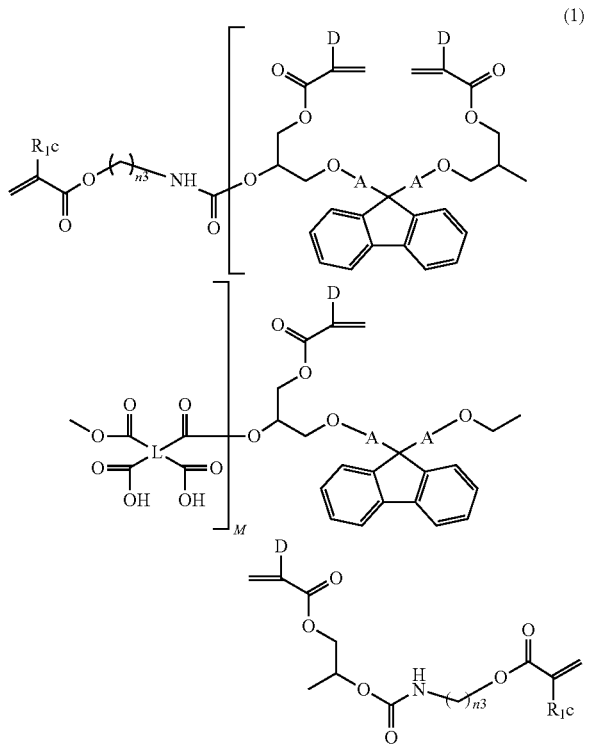

in formula (1), A represents a phenylene group, and a hydrogen atom on the phenylene group can be substituted by a C1 to C5 alkyl group, a halogen atom, or a phenyl group;
$R_1c$ is a hydrogen atom or a C1 to C8 alkyl group;
n3 represents an integer of 1 to 12;
L represents a tetravalent carboxylic acid residue;
D represents a hydrogen atom or a methyl group;
M represents an integer of 1 to 20.

2. The photosensitive resin composition of claim 1, wherein an unsaturated equivalent range of the first alkali-soluble resin (A-1) is 240 to 1000.

3. The photosensitive resin composition of claim 1, wherein a weight-average molecular weight range of the first alkali-soluble resin (A-1) is 1000 to 30000.

4. The photosensitive resin composition of claim 1, wherein an acid value range of the first alkali-soluble resin (A-1) is 10 mgKOH/g to 150 mgKOH/g.

5. The photosensitive resin composition of claim 1, wherein based on a usage amount of 100 parts by weight of the alkali-soluble resin (A), a usage amount of the first alkali-soluble resin (A-1) is 10 parts by weight to 100 parts by weight, a usage amount of the compound (B) containing the ethylenically-unsaturated group is 20 parts by weight to 150 parts by weight, a usage amount of the photoinitiator (C) is 10 parts by weight to 90 parts by weight, and a usage amount of the solvent (D) is 1000 parts by weight to 7500 parts by weight.

6. The photosensitive resin composition of claim 1, further comprising a colorant (E).

7. The photosensitive resin composition of claim 6, wherein based on a usage amount of 100 parts by weight of the alkali-soluble resin (A), a usage amount of the colorant (E) is 50 parts by weight to 800 parts by weight.

8. A black matrix formed by the photosensitive resin composition of claim 1.

9. A pixel layer formed by the photosensitive resin composition of claim 1.

10. A protective film formed by the photosensitive resin composition of claim 1.

11. A color filter comprising the black matrix of claim 8.

12. A color filter comprising the pixel layer of claim 9.

13. A color filter comprising the protective film of claim 10.

14. A liquid crystal display apparatus comprising the color filter of claim 11.

15. A manufacturing method of a photosensitive resin composition, comprising mixing a composition comprising an alkali-soluble resin (A), a compound (B) containing an ethylenically-unsaturated group, a photoinitiator (C), and a solvent (D),
wherein the alkali-soluble resin (A) comprises a first alkali soluble resin (A-1) represented by formula (1),

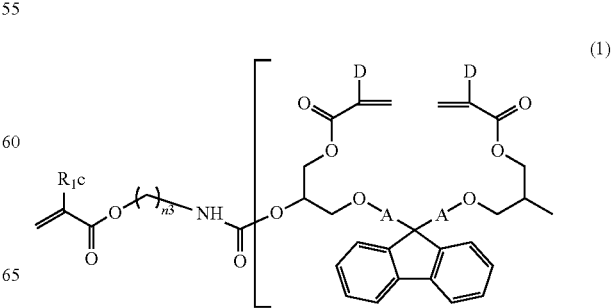

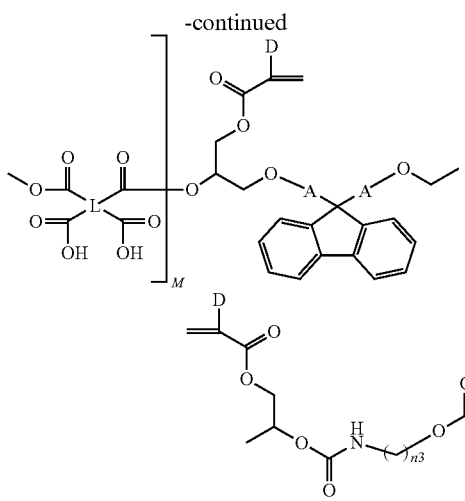

in formula (1), A represents a phenylene group, and a hydrogen atom on the phenylene group can be substituted by a C1 to C5 alkyl group, a halogen atom, or a phenyl group;

$R_1c$ is a hydrogen atom or a C1 to C8 alkyl group;

n3 represents an integer of 1 to 12;

L represents a tetravalent carboxylic acid residue;

D represents a hydrogen atom or a methyl group;

M represents an integer of 1 to 20; and the first alkali-soluble resin (A-1) represented by formula (1) is obtained via a reaction of a mixture comprising an (a-1) component, an (a-2) component, and an (a-3) component, and the (a-1) component is a diol compound containing a polymerizable unsaturated group, the (a-2) component is a tetracarboxylic acid or an acid dianhydride thereof, and the (a-3) component is a compound containing a polymerizable unsaturated group and an isocyanate group.

16. The manufacturing method of the photosensitive resin composition of claim 15, wherein the (a-1) component is a diol compound containing a polymerizable unsaturated group represented by formula (2) below:

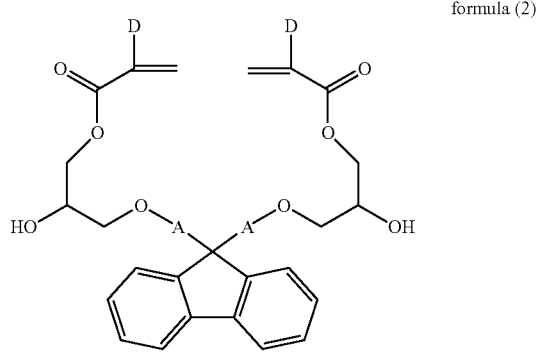

formula (2)

in formula (2), A represents a phenylene group, and a hydrogen atom on the phenylene group can be substituted by a C1 to C5 alkyl group, a halogen atom, or a phenyl group;

D represents a hydrogen atom or a methyl group.

17. The manufacturing method of the photosensitive resin composition of claim 15, wherein the (a-3) component is a compound containing a polymerizable unsaturated group and an isocyanate group represented by formula (5) below:

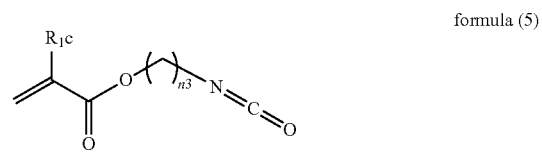

formula (5)

in formula 5, $R_{1c}$ is hydrogen or a C1 to C8 alkyl group; n3 represents an integer of 1 to 12.

18. The manufacturing method of the photosensitive resin composition of claim 15, wherein a molar ratio (a-2)/(a-1) of the (a-1) component and the (a-2) component is 0.2 to 1.0.

19. The manufacturing method of the photosensitive resin composition of claim 15, wherein a molar ratio (a-3)/(a-1) of the (a-1) component and the (a-3) component is 0.02 to 1.6.

20. The manufacturing method of the photosensitive resin composition of claim 15, wherein an unsaturated equivalent range of the first alkali-soluble resin (A-1) is 240 to 1000.

21. The manufacturing method of the photosensitive resin composition of claim 15, wherein a weight-average molecular weight range of the first alkali-soluble resin (A-1) is 1000 to 30000.

22. The manufacturing method of the photosensitive resin composition of claim 15, wherein an acid value range of the first alkali-soluble resin (A-1) is 10 mgKOH/g to 150 mgKOH/g.

23. The manufacturing method of the photosensitive resin composition of claim 15, wherein the composition further comprises a colorant (E).

24. A black matrix formed by the photosensitive resin composition obtained by the manufacturing method of the photosensitive resin composition of claim 15.

25. A pixel layer formed by the photosensitive resin composition obtained by the manufacturing method of the photosensitive resin composition of claim 15.

26. A protective film formed by the photosensitive resin composition obtained by the manufacturing method of the photosensitive resin composition of claim 15.

27. A color filter, comprising:
the black matrix of claim 24.

28. A color filter, comprising:
the pixel layer of claim 25.

29. A color filter, comprising:
the protective film of claim 26.

30. A liquid crystal display apparatus, comprising:
the color filter of claim 27.

* * * * *